(12) United States Patent
Inanc et al.

(10) Patent No.: US 8,965,069 B2
(45) Date of Patent: Feb. 24, 2015

(54) THREE DIMENSIONAL MINUTIAE EXTRACTION IN THREE DIMENSIONAL SCANS

(71) Applicant: University of Louisville Research Foundation, Inc., Louisville, KY (US)

(72) Inventors: Tamer Inanc, Louisville, KY (US); Sara Shafaei, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 186 days.

(21) Appl. No.: 13/631,041

(22) Filed: Sep. 28, 2012

(65) Prior Publication Data

US 2014/0093146 A1 Apr. 3, 2014

Related U.S. Application Data

(60) Provisional application No. 61/541,595, filed on Sep. 30, 2011.

(51) Int. Cl.
*G06K 9/00* (2006.01)
*G06K 9/54* (2006.01)

(52) U.S. Cl.
CPC .................................. *G06K 9/00073* (2013.01)
USPC ............................ 382/125; 382/154; 382/305

(58) Field of Classification Search
CPC . G06K 9/00; G06K 9/00073; G06K 9/00013; G06K 9/00067; G06K 9/0008; G06K 9/00201; G06K 9/00214
USPC .......... 382/100, 115, 124, 125, 154, 276, 293, 382/296, 254, 116, 128, 132, 278, 126, 127, 382/305
See application file for complete search history.

(56) References Cited

U.S. PATENT DOCUMENTS

| | | | | |
|---|---|---|---|---|
| 5,799,098 | A * | 8/1998 | Ort et al. | 382/125 |
| 7,197,168 | B2 * | 3/2007 | Russo | 382/125 |
| 7,212,655 | B2 * | 5/2007 | Tumey et al. | 382/116 |
| 7,333,641 | B2 * | 2/2008 | Hara et al. | 382/125 |
| 7,356,171 | B2 * | 4/2008 | Werthiem et al. | 382/124 |
| 8,520,888 | B2 * | 8/2013 | Spitzig et al. | 382/100 |
| 8,600,123 | B2 * | 12/2013 | Abramovich et al. | 382/124 |
| 2008/0101664 | A1 * | 5/2008 | Perez | 382/125 |

OTHER PUBLICATIONS

"Data Acquisition and Quality Analysis of 3-Dimensional Fingerprints". Florida: IEEE conference on Biometrics, Identity and Security. Ridge and valley signatures may also be obtained using a touchless three-dimensional ridge and valley scanner using a digital processing means. (Wang, Yongchang; Q. Hao, A. Fatehpuria, D. L. Lau and L. G. Hassebrook.*

* cited by examiner

*Primary Examiner* — Sheela Chawan
(74) *Attorney, Agent, or Firm* — Wood, Herron & Evans, LLP

(57) ABSTRACT

A system and method extract a plurality of three dimensional identification minutiae from a three dimensional image of a biometric identification feature. The extracted three dimensional identification minutiae from the three dimensional image may be compared to one or more sets of three dimensional identification minutiae to determine an identification and/or confirm an identification. In a preferred embodiment, the system and method extract three dimensional identification minutiae from a three dimensional image of a fingerprint, and compare the extracted three dimensional identification minutiae from the fingerprint to one or more sets of three dimensional identification minutiae associated with previously classified fingerprints to determine and/or confirm an identification.

22 Claims, 23 Drawing Sheets
(14 of 23 Drawing Sheet(s) Filed in Color)

US 8,965,069 B2

THREE DIMENSIONAL MINUTIAE EXTRACTION IN THREE DIMENSIONAL SCANS

CROSS-REFERENCE TO RELATED APPLICATIONS

This application claims priority to U.S. Provisional Application Ser. No. 61/541,595 filed by Sara Shafaei and Tamer Inanc on Sep. 30, 2011, and entitled "THREE DIMENSIONAL MINUTIAE EXTRACTION IN THREE DIMENSIONAL SCANS," which application is incorporated by reference in its entirety.

GOVERNMENT RIGHTS

The invention was made with Government support under U.S. Department of Homeland Security contract no. HSHQDC-07-3-00005. The Government has certain rights in the invention.

FIELD OF THE INVENTION

The invention is generally related to analyzing a three dimensional image to identify three dimensional identification minutiae located on the three dimensional image.

BACKGROUND OF THE INVENTION

In conventional identification systems, an identification feature (e.g., finger print, palm-print, hand print) may be captured in a two dimensional image using a two dimensional scanner. An identification feature, such as a fingerprint may be analyzed to determine a person's identity by comparing the captured fingerprint to a database including images of fingerprints, and a person's identity may be confirmed by matching the captured fingerprint to a previously captured image of the person's fingerprint. In conventional systems, the identification feature includes a plurality of identification minutiae located at unique positions on the identification feature, where the unique locations of the identification minutiae may be identified and compared to identification minutiae on the previously captured identification feature to determine a match (i.e., determine the person's identity and/or confirm the person's identity). There are approximately 150 different types of identification minutiae for a fingerprint; however, in practice, conventional systems typically categorize the various types into two general classifications: ridge ends—for example, where a ridge of a fingerprint ends, referred to as a "termination;" and ridge splits—for example where a fingerprint ridge splits into two ridges, which is referred to as a "bifurcation." Furthermore, for each ridge in an identification feature, a ravine (e.g., a valley) is typically proximate the ridge. Hence, for example, a fingerprint typically comprises a plurality of ridges and a plurality of proximate ravines.

Conventional systems analyze a two dimensional image of the fingerprint to identify the identification minutiae, which is generally referred to as minutiae extraction. The two dimensional image of the identification feature may be analyzed to identify identification minutiae. The extracted identification minutiae may be compared by the computer to one or more identification minutiae associated with an identity (i.e., a particular person) to determine if the captured fingerprint also corresponds to the identity. In other words, the extracted identification minutiae are used to determine a person's identity by determining if they match identification minutiae previously associated with the person.

Traditionally, identification image acquisition was based on contact. For example, a finger would be placed on a fingerprint scanner, and a two dimensional image of the fingerprint would be captured by the fingerprint scanner. In conventional two dimensional identification systems, placing the identification feature (e.g., a finger, a hand, etc.) on the two dimensional scanner introduces distortions and deformations to the captured two dimensional image. For example, pressing a finger onto a scanning surface may cause the finger to flatten and cause the ridges of the fingerprint to distort and deform in unpredictable ways. The distortions and deformations associated with two dimensional capture may lead to problems analyzing the two dimensional image to identify the identification minutiae on the two dimensional image. In turn, the errors in correctly identifying the identification minutiae may lead to incorrect identification and/or confirmation of a person's identity. In addition, pressing a finger to a surface of a scanner may cause latent fingerprint problems, where a trace of the fingerprint remains on the surface of the scanner, which may lead to forgery and hygiene problems. Other issues such as degraded or partial images caused by improper fingerprint placement, smearing, or sensor noise from a tear on a surface coating often occur in conventional two dimensional identification systems. All the issues in turn may lead to mis-identification and/or failure to determine an identity.

Three dimensional images of identification features (e.g., a finger, a hand, a palm) have been developed, such that contact is no longer required to capture the image. For example, a person may place a finger into a three dimensional scanner and a fingerprint may be captured in a three dimensional image without the person pressing the finger to a surface. As such, three dimensional images of fingerprints, palm-prints, hand-prints, and other such images may be captured without significant distortions or deformations of the identification feature being captured. Moreover, three dimensional identification image capture systems address other issues including hygiene, latent fingerprints, etc. In addition, three dimensional image capturing systems may capture large areas as images quickly. However, in conventional systems, the captured three dimensional images are typically projected into a two dimensional image, and the two dimensional image is then analyzed using conventional two dimensional methods to identify identification minutiae.

While capturing the identification feature in a three dimensional image reduces deformations and distortions associated with capturing an image of the identification feature, projecting the three dimensional image into a two dimensional image introduces deformations and distortions into the two dimensional image. As such, in these conventional systems, errors in identifying the identification minutiae, determining an identification, and/or confirming an identification may still occur.

Therefore, a significant need continues to exist in the art for improved systems and methods for identifying identification minutiae in a three dimensional image.

SUMMARY OF THE INVENTION

The invention addresses these and other problems associated with the prior art by using a system and method that identify three dimensional identification minutiae on a three dimensional image of a biometric identification feature, where it is understood that a three dimensional image stores data representing an object in a three dimensional space, and typically represents locations of the features on the object in a three dimensional space (e.g., using x-y-z coordinates, etc.). In some embodiments, the invention directly analyzes the three dimensional image without projecting the image to a two dimensional image, thereby reducing distortion and deformations associated with projecting the image. In other embodiments, the invention projects the three dimensional image to a two dimensional image and adjusts the projected two dimensional image based on one or more determined texture characteristics of the three dimensional image to reduce distortion and deformations associated with projecting the image.

The invention has and hereinafter will be described with regard to fingerprints, however those skilled in the art will recognize that the same methods and systems of the present invention apply also to other types of identification features, including for example, palm-prints, hand-prints, foot-prints and other such identification features, and as such, the invention is not so limited to fingerprints.

In some embodiments of the invention, a computer including a processor and memory may receive a three dimensional image of a fingerprint, and the computer may directly analyze the three dimensional image to identify identification minutiae included in the three dimensional image of the fingerprint. After identifying three dimensional minutiae in a three dimensional image, the three dimensional image and/or extracted identification minutiae may be compared to one or more identification images (i.e., images of previously captured fingerprints and/or extracted identification minutiae associated with a specific person) to determine the identity of the person and/or confirm the identity of the person.

In some embodiments, analysis of the three dimensional image includes analyzing one or more three dimensional characteristics of the identification feature captured in the three dimensional image to identify the identification minutiae. For example, a computer may analyze the three dimensional image to determine one or more curvatures of the captured identification feature, one or more vector directions associated with the captured identification feature, one or more depths associated with the captured identification feature, and/or other such three dimensional characteristics. Furthermore, the computer may extract a plurality of identification minutiae from the three dimensional image based at least in part on the determined three dimensional characteristics.

In some embodiments, a computer loads a three dimensional image of an identification feature. The computer analyzes at least a portion of the three dimensional image of the identification feature to identify ridge point locations on the portion of the three dimensional image. The computer analyzes each ridge point location to identify identification minutiae on the portion of the three dimensional image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Embodiments consistent with the invention analyze a three dimensional scan (i.e., a three dimensional image) of an identification feature to identify a plurality of identification minutiae. While such three dimensional scans are referred to herein as a three dimensional image, the invention is not so limited. In general, the three dimensional image/scan may be any data that provides a representation of a surface of an identification feature. In some embodiments of the invention, a three dimensional image of an identification feature is converted to a two dimensional image of the identification feature, where the two dimensional image is based at least in part on a texture of the three dimensional image, and identification minutiae are identified on the two dimensional image. In some embodiments, a three dimensional image is analyzed and identification minutiae are identified on the three dimensional image.

Figure 1:
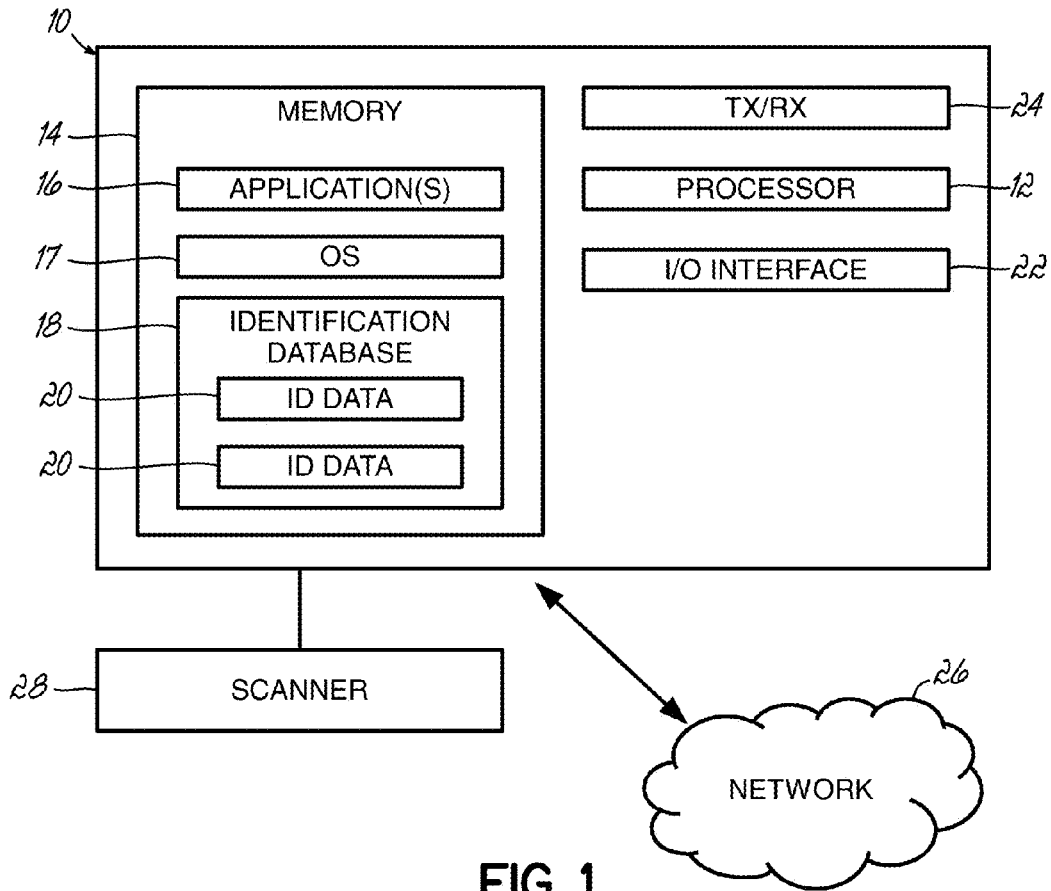
FIG. 1 is a diagrammatic illustration of a computer configured to analyze a three dimensional image of an identification feature consistent with embodiments of the invention to identify identification minutiae on the three dimensional image.

Turning now to the figures, and particularly FIG. 1, this figure is a diagrammatic illustration of a computer 10 consistent with embodiments of the invention. As shown in FIG. 1, computer 10 includes a processor 12 and a memory 14. Memory 14 may include application 16, where application 16 includes one or more instructions configured to be executed by processor 12 to thereby cause processor 12 to perform the steps necessary to execute elements consistent with embodiments of the invention.

Memory 14 may further include identification database 18, where identification database 18 includes one or more identification data records 20. Each identification data record 20 corresponds an individual and generally stores data associated with the identification of the individual, including for example, the individual's personal information (e.g., name, address, citizenship, etc.), one or more three dimensional images of identification features of the individual, and/or data indicating one or more identified identification minutiae of one or more identification features of the individual.

For example, an identification record 20 may include data indicating identified identification minutiae of a finger of an individual and may further include data indicating an identity associated with the identified identification minutiae. As another example, an identification data record 20 may include a three dimensional image of a finger of an individual and may further include data indicating an identity associated with the three dimensional image of the finger. In some embodiments of the invention, an individual's identity and sensitive identification data may be limited by only storing data indicating identified identification minutiae of an identification feature in an identification data record and not image data of the identification feature.

Computer 10 may further include input-output interface (I/O interface) 22, where I/O interface 22 may be configured to transmit data to and receive data from one or more devices connected to computer 10. Devices connected to computer 10 and communicating through I/O interface 22 may include, for example a keyboard, a computer mouse, a computer monitor, a printer, a three dimensional scanner, computer speakers, and other such devices. Furthermore, computer 10 may include a transceiver (Tx/Rx) 24, where Tx/Rx may be configured to transmit data to and receive data from a communication network 26. Furthermore, computer 10 may be connected to an identification feature scanner 28, where the scanner may be configured to scan an identification feature to generate data corresponding to the scanned identification feature. For example the scanner may capture a three dimensional image of at least a portion of an identification feature such as a fingerprint, palm print, etc.

Figure 2:
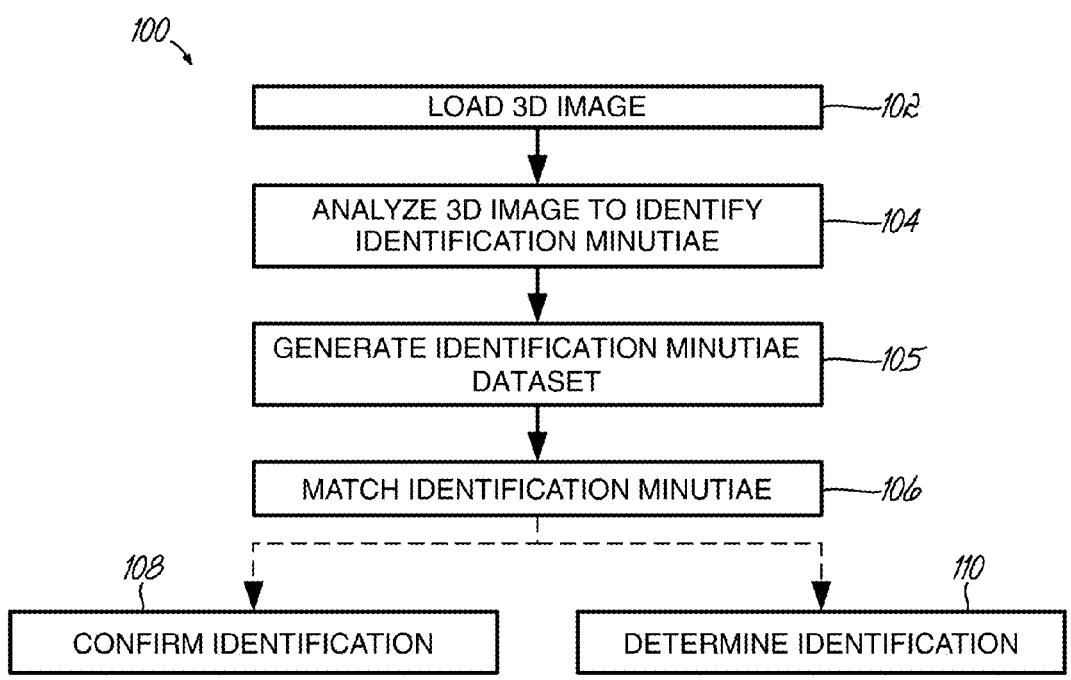
FIG. 2 is a flowchart illustrating a sequence of operations executable by a processor of the computer of FIG. 1 to thereby cause the processor to perform steps necessary to analyze a three dimensional image of an identification feature to identify a plurality of identification minutiae.

FIG. 2 is a flowchart 100 illustrating a sequence of operations that may be executed by a computer to cause a processor of the computer to analyze a three dimensional image of an identification feature, identify a plurality of identification minutiae of the identification feature, and confirm an identification and/or determine an identification based on the identified identification minutiae. A computer loads a three dimensional image (block 102), where the three dimensional image represents at least a portion of an identification feature (e.g., a fingerprint, a palm print, a hand print, a foot print).

In some embodiments the computer analyzes the three dimensional image to identify a plurality of identification minutiae (block 104). In some embodiments, the computer analyzes characteristics of the three dimensional image to identify the plurality of identification minutiae from the three dimensional image. For example, the computer may analyze one or more characteristics of the three dimensional image to identify identification minutiae. In another example the computer may convert the three dimensional image to a two dimensional image, where the computer adjusts the two dimensional image based at least in part on one or more texture characteristics of the three dimensional image, and the computer may analyze the two dimensional image to identify the identification minutiae.

In some embodiments, analyzing the three dimensional image to identify the plurality of identification minutiae may include fitting a three dimensional mesh to at least a portion of the three dimensional image. In some embodiments, analyzing the three dimensional image to identify the plurality of identification minutiae may include determining a curvature of one or more points in the three dimensional image. In some embodiments, analyzing the three dimensional image to identify the plurality of identification minutiae may include determining a direction vector of one or more points in the three dimensional image. In some embodiments, analyzing the three dimensional image to identify the plurality of identification minutiae may include determining a depth associated with one or more points in the three dimensional image.

In some embodiments, analyzing the three dimensional image to identify the plurality of identification minutiae may include determining one or more ridge points in the three dimensional image. In some embodiments, analyzing the three dimensional image to identify the plurality of identification minutiae may include determining one or more ravine points in the three dimensional. In some embodiments, analyzing the three dimensional image to identify the plurality of identification minutiae may include generating one or more ridge lines on the three dimensional image based at least in part on the determined ridge points. In some embodiments, analyzing the three dimensional image to identify the plurality of identification minutiae may include generating one or more ravine lines on the three dimensional image based at least in part on the determined ravine lines.

In some embodiments, analyzing the three dimensional image to identify the plurality of identification minutiae may include generating a quality map based at least in part on the determined depth(s) and/or determined direction vector(s), the quality map including data indicating regions of high quality and regions of low quality. Moreover, in some embodiments, analyzing the three dimensional may include applying the generated quality map to the three dimensional image, and identifying the plurality of identification minutiae may include identifying identification minutiae in indicated high quality regions.

The computer may generate an identification minutiae dataset for the three dimensional image based on the identified identification minutiae (block 105). In such embodiments, the identification minutiae dataset stores data indicating the identified identification minutiae in a format that may be compared to one or more other identification minutiae datasets to determine and/or confirm an identity. The computer may compare the identification minutiae dataset of the three dimensional image to one or more datasets of identification minutiae, where each dataset is associated with an identification (i.e., a person's identity), such that the computer may match the extracted identification minutiae to a previously classified dataset to determine a match (block 106). In some embodiments, the computer determines whether the extracted identification minutiae match a dataset to confirm an identification (block 108), i.e., the computer matches identification minutiae to determine if a person is a specific person. In some embodiments, the computer determines which dataset of identification minutiae of a plurality of datasets the extracted identification minutiae match to determine an identification (block 110), i.e., the computer scans a database including a plurality of datasets of identification minutiae, where each dataset includes an associated identification, to match the extracted identification minutiae to a respective dataset and thereby determine the identification that corresponds to the extracted identification minutiae based on the respective dataset.

Figure 3:
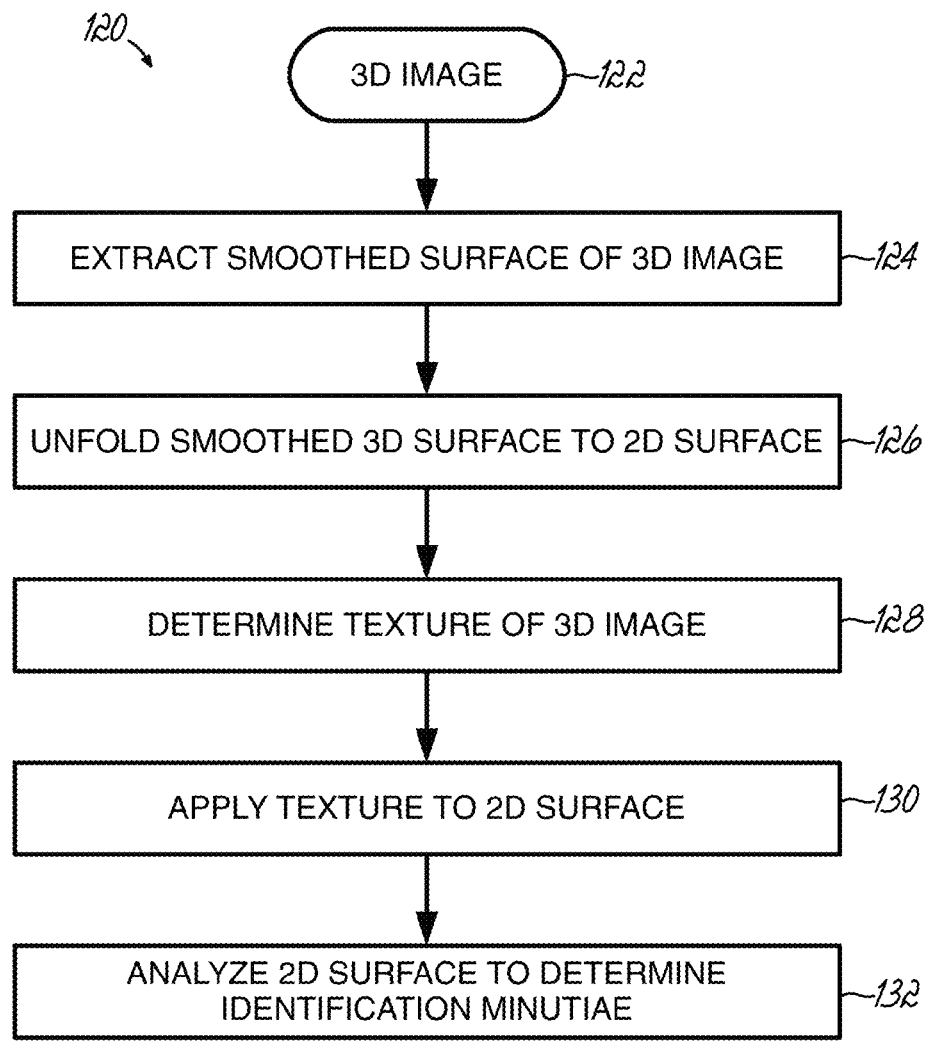
FIG. 3 is a flowchart illustrating a sequence of operations executable by a processor of the computer of FIG. 1 to thereby cause the processor to perform steps necessary to convert the three dimensional image to a two dimensional image and analyze the two dimensional image to identify identification minutiae thereon.

FIG. 3 provides flowchart 120 that illustrates a sequence of operations that may be performed by a computer consistent with embodiments of the invention to determine and extract identification minutiae from a three dimensional image of an identification feature. The three dimensional image is input (block 122), and the computer extracts a smoothed surface of the three dimensional image (block 124).

In some embodiments, the computer may extract the smoothed surface of the three dimensional image using a weighted linear least square algorithm, where the weights may be calculated by a Gaussian function.

At each three dimensional point of the three dimensional image, a plane may be fitted to the point under consideration and the points in the neighborhood of it. Therefore, an N×N window centered at the point of interest is considered and the plane is fitted to the points inside the window using a weighted linear least square method. The points close to the point of interest or center of the window are given higher weights, and points that are further are given lower weights.

$$S = \min_{a,b,c} \Sigma_{i=1}^{N^2} w_i \cdot (Z_i - (ax_i + by_i + c))^2 \quad (1)$$

Figure 4:
FIG. 4 is an example of a three dimensional image of an identification feature in the form of a fingerprint.
Figure 5:
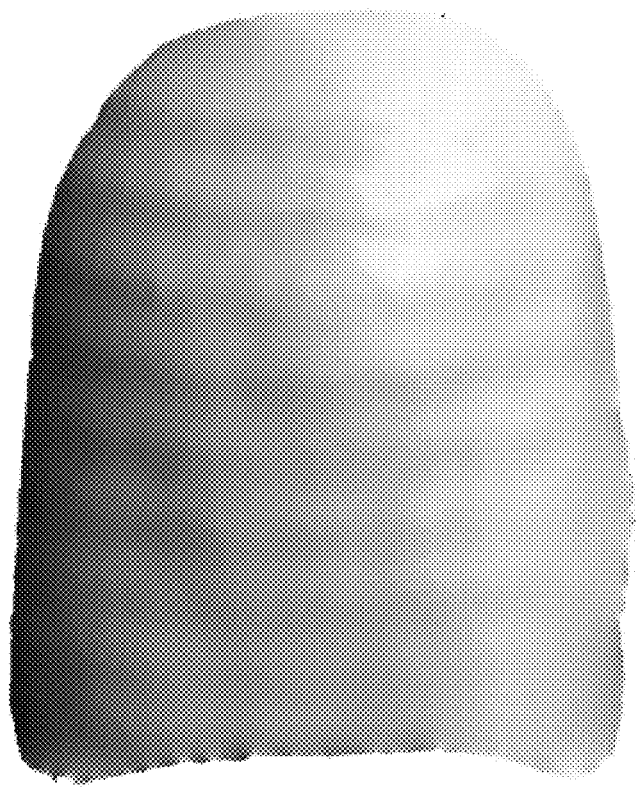
FIG. 5 is an example of the three dimensional image of FIG. 4 after the computer of FIG. 1 performs a smoothing operation thereon according to the operations of shown in FIG. 3.

$w_i$ is the weight of the $i^{th}$ point. $N^2$ corresponds to the number of points in the N×N window. The weight of each point shows its influence on the plane fitting. Closer points to the center have a higher weight than the further points. A Gaussian function is used to calculate the weights:

$$w_i = e^{-d_i^2/\sigma^2} \quad (2)$$

where $d_i$ is the Euclidean distance between the $i^{th}$ point inside the window and the window's center point. Equation (1) can be minimized by setting partial derivatives of the function $\Sigma_{i=1}^{N} w_i \cdot (Z_i - (ax_i + by_i + c))^2$ to zero. A linear system of equations may be obtained by taking partial derivatives with respect to the unknown coefficients a, b, and c. As such, coefficients may be obtained from the formula:

$$C = (X^T W X)^{-1} X^T W Z \quad (3)$$

where C includes coefficients; X includes the three dimensional x and y coordinates of the points; Z includes the three dimensional z coordinates of the points, and W includes the weights. FIG. 4 illustrates an example of a three dimensional image of a fingerprint, and FIG. 5 illustrates an example of an extracted smoothed surface of the three dimensional image of FIG. 4.

Returning to the flowchart 120 of FIG. 3, the computer unfolds the smoothed three dimensional surface to a two dimensional surface (i.e., a two dimensional image) (block 126). Once the smoothed approximation has been generated, the three dimensional smoothed surface may be unfolded/unrolled to generate a two dimensional rolled-equivalent image (e.g., a two dimensional rolled-equivalent fingerprint image). Such unfolding may be performed by the computer utilizing a "springs algorithm" as discussed by Atkins et al. in the article "Halftone post-processing for improved rendition of highlights and shadows," J. Elec. Imaging, 9:151-158, 2000, the details of which are incorporated herein by reference in its entirety. A physics based modeling system may be utilized to unfold the smoothed three dimensional surface, such as the physics based modeling system disclosed in "Acquiring a 2-d rolled equivalent fingerprint image from a non-contact 3-d finger scan," Proceedings of SPIE, the International Society for Optical Engineering, pg. 2020C-1-62020C-8, 2006, by Fatehpuria et al.

Such methods may include performing halftone post-processing on the smoothed three dimensional surface to rearrange image pixels and thereby generate a smoother rendition. In addition, the computer may assume virtual springs between a point under consideration and neighboring points. The point may be moved to a different location based on minimizing the energy in the virtual springs. A point under consideration and neighboring points may be considered a mechanical system, in which each point has some mass, and each point is connected to neighboring points with virtual springs. Each virtual spring may include a relax length and the virtual spring has a minimum energy when the virtual spring is at its relax length. An iterative process may be performed by the computer to calculate the displacement of one or more points, such that the virtual springs are stretched/compressed to reach their relax length, thereby achieving minimum energy in the springs. Displacement may be applied iteratively to the points under consideration, while neighboring points remain fixed.

To calculate the total energy in each point, the energy that is stored in the springs, which connect the point to its neighbors, is added together. The magnitude of the energy of each spring is obtained by squaring the magnitude of the displacement between the current length of the spring and its relaxed length, and the sign of energy is determined by subtracting the relax length from the current length. Further details may be found in "Halftone post-processing for improved rendition of highlights and shadows."

After generating the unfolded two dimensional surface, the computer may adjust the two dimensional surface based at least in part on texture characteristics of the three dimensional image. As such, the computer may analyze the three dimensional image to determine one or more texture characteristics of the three dimensional image (block 128). In some embodiments of the invention, analyzing the three dimensional image to determine one or more texture characteristics of the three dimensional image includes identifying ridge points (i.e., pixels that correspond to a ridge of the identification feature represented by the three dimensional image) on the three dimensional image, and the computer may assign a value to a corresponding pixel on the two dimensional image to thereby indicate that the corresponding pixel of the two dimensional image is associated with a ridge point.

In some embodiments, the computer may analyze texture characteristics of the three dimensional image by analyzing curvature of points of the three dimensional image. In addition, the computer may apply a median filter to the three dimensional image to thereby reduce sharp spikes that may occur when scanning an identification feature. The computer may further apply a low pass filter to smooth the surface represented by the three dimensional image, such that ridges and valleys of the identification feature represented in the three dimensional image may be smoothed to reduce noise associated with collecting the data and/or to adjust for pores of the identification feature. Such filtering may be performed similar to the methods disclosed in "Face recognition based on 3d ridge images obtained from range data," Pattern Recognition, 42:445-451, March 2009.

Embodiments of the invention may identify ridge points of the three dimensional image by utilizing Gaussian and mean curvature analysis. In three dimensional Euclidean space, a surface may be defined by two partial differential equations, the so-called first and second fundamental form of differential geometry. These fundamental forms determine how to measure the length, area and the angle of the surface, and the normal surface curvature may be calculated from these two fundamental forms. The first fundamental form (I) is defined as the inner product of dx with itself, where dx is tangent to the surface in the direction defined by du and dv:

$$I = dx \cdot dx \quad (4)$$
$$= (x_u du + x_v dv) \cdot (x_u du + x_v dv)$$
$$= (x_u \cdot x_u)du^2 + 2(x_u \cdot x_v)dudv + (x_v \cdot x_v)dv^2$$
$$= Edu^2 + 2Fdudv + Gdv^2$$

where E, F, and G are first fundamental coefficients. The second fundamental form (II) is defined as the inner product of dx and dN, where dN means the spatial rate of change of unit normal vector N to the surface:

$$II = -dx \cdot dN = -(x_u du + x_v dv) \cdot (N_u du + N_v dv) \quad (5)$$
$$= (x_u \cdot N_u)du^2 + 2(x_u \cdot N_v + X_v \cdot N_u)dudv + (x_v \cdot N_v)dv^2$$
$$= Ldu^2 + 2Mdudv + Ndv^2$$

L, M, and N are the second fundamental coefficients. The Guassian and mean curvatures K and H may be defined as:

$$K = k_1 k_2 = \frac{LN + M^2}{EG - F^2} \quad (6)$$

$$H = \frac{1}{2}(k_1 + k_2) = \frac{EN - 2FM + GL}{2(EG - F^2)} \quad (7)$$

and the principal curvatures $k_1$ and $k_2$ may be determined by the computer using the following formulas:

$$k_1 = H + \sqrt{H^2 - K}$$

$$k_2 = H - \sqrt{H^2 - K} \quad (8)$$

The computer may utilize the Guassian and mean curvature to determine whether each point (i.e., pixel) of the three dimensional image corresponds to a ridge point or a valley point of the fingerprint. Therefore, in some embodiments, the texture of the three dimensional image may be determined utilizing the Guassian and mean curvature.

Figure 6:
FIG. 6 is an example of a two dimensional image generated by the computer of FIG. 1 based on the three dimensional image of FIG. 4.

The computer may apply the texture of the three dimensional image to the two dimensional image (block 130). In some embodiments, the computer may apply the texture of the three dimensional image to the unfolded two dimensional image by setting the color value of each point (i.e., pixel) of the two dimensional image to black if the corresponding point (i.e., voxel) of the three dimensional image is determined to correspond to a ridge point. FIG. 6 illustrates an example unfolded two dimensional image of a fingerprint with the texture of the three dimensional image applied to the surface represented by the two dimensional image.

Figure 7:
FIG. 7 is an example of an enhanced two dimensional image based on the two dimensional image of FIG. 6.

The computer may analyze the two dimensional image to determine one or more identification minutiae of the surface of the identification feature represented by the two dimensional image (block 132). In some embodiments, the computer may filter the two dimensional image to thereby enhance the two dimensional image prior to analyzing the two dimensional image to identify the identification minutiae. For example, the computer may enhance the two dimensional image utilizing a block-wise contextual filter method as described in the article "Verifying fingerprint match by local correlation methods," by J. Li et al., First IEEE International Conference on Biometrics: Theory, Applications, and Systems, pg. 1-5, 2007. FIG. 7 illustrates the two dimensional image of FIG. 6 after enhancing the image.

Figure 8:
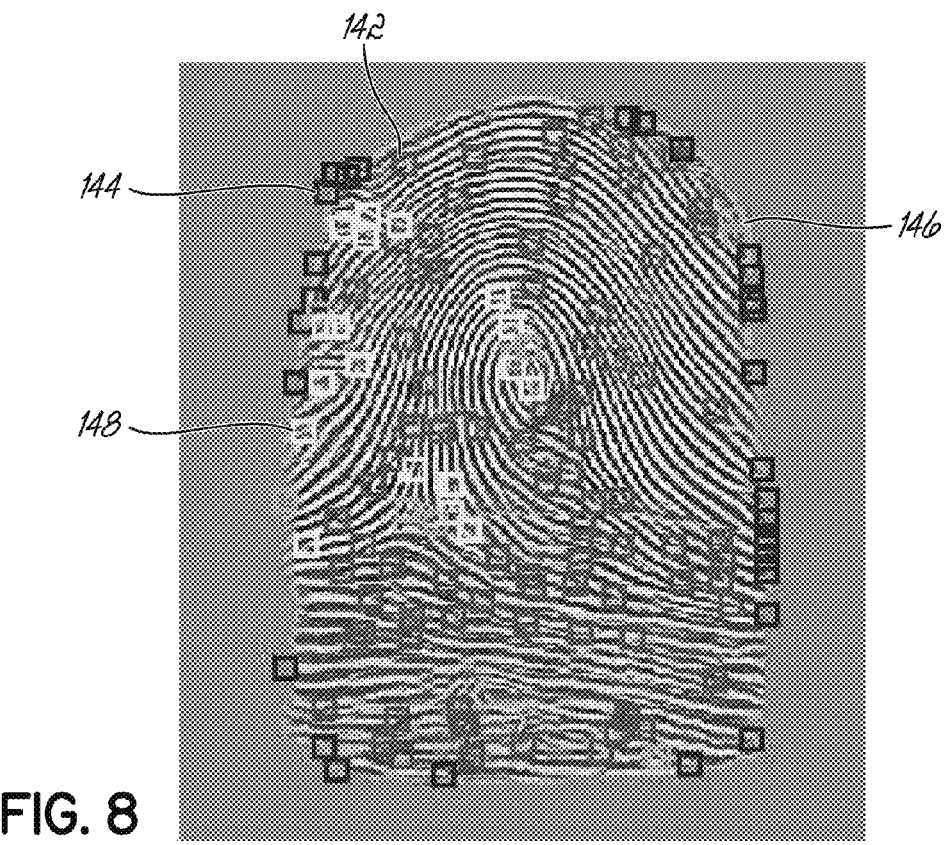
FIG. 8 illustrates identified identification minutiae on the enhanced two dimensional image of FIG. 7.

The computer may analyze the surface of the identification feature represented by the two dimensional image to determine identification minutiae utilizing the Biometric Image Software (BIS) provided by the National Institute of Science and Technology (NIST) of the United States Department of Commerce and/or other such known two dimensional image analysis software packages such as the NIST Fingerprint Image Software (NFIS) also provided by the NIST. FIG. 8 illustrates identified identification minutiae 202, 204, 206, 208 on the two dimensional image. The computer may further determine a quality associated with each identified minutiae such that the computer may disregard identification minutiae that are identified due to errors and/or distortion associated with capturing the image of the identification feature. For example, a minutiae detection package of the NFIS and BIS determines a quality associated with each identified identification minutiae based on a direction, contrast, flow, and/or high curve associated with pixels of the two dimensional image. In the example shown in FIG. 8, the identification minutiae 142, 144, 146, 148 are labeled with different colors to indicate a quality associated with such identification minutiae 142, 144, 146, 148. In this example, identification minutiae labeled with the red color 142 are generally identified as high quality identification minutiae and identification minutiae labeled with the blue color 144 are identified as low quality minutiae. The identification minutiae labeled with the green color 146 and yellow color 148 are identification minutiae between the high quality and low quality identification minutiae 142, 144.

Figure 9:
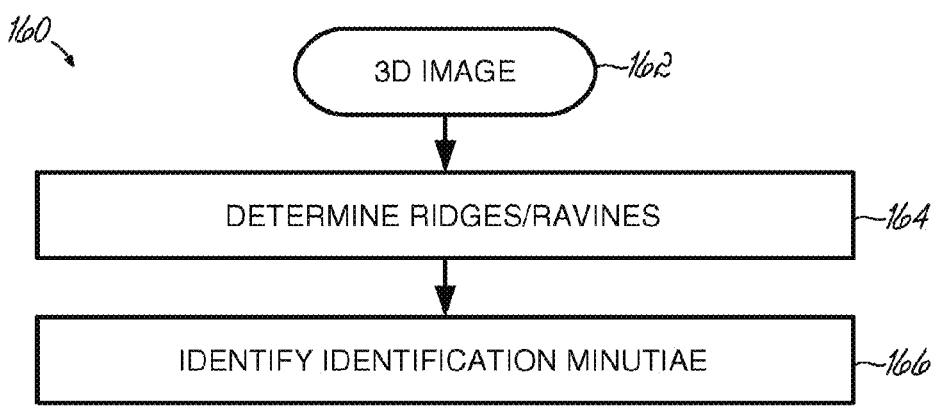
FIG. 9 is a flowchart illustrating a sequence of operations executable by a processor of the computer of FIG. 1 to thereby cause the processor to perform steps necessary to identify identification minutiae on the three dimensional image of FIG. 4.

FIG. 9 provides a flowchart 160 illustrating a sequence of operations that may be performed by a computer to identify identification minutiae of an identification feature represented by a three dimensional image. The computer may load the three dimensional image (block 162), analyze the three dimensional image to determine ridges and ravines of the identification feature represented by the three dimensional image (block 164), and the computer may identify one or more identification minutiae of the identification feature on the three dimensional image based at least in part on the determined ridges/ravines of the identification feature (block 166).

In some embodiments of the invention, the computer may analyze the curvature of one or more three dimensional points (i.e., voxels) of the three dimensional image to determine whether the voxel corresponds to a ridge or a ravine of the identification feature represented by the three dimensional image. The computer may determine ridges and ravines of the identification feature represented by the three dimensional image based on the ridge/ravine determination of the one or more voxels, and the computer may identify identification minutiae based on the determined ridges and ravines. After identifying the identification minutiae, the computer may store the identified identification minutiae as an identification minutiae dataset, and the identification minutiae dataset extracted from the three dimensional image may be compared to one or more other identification minutiae datasets to determine an identity and/or confirm an identity.

Figure 10:
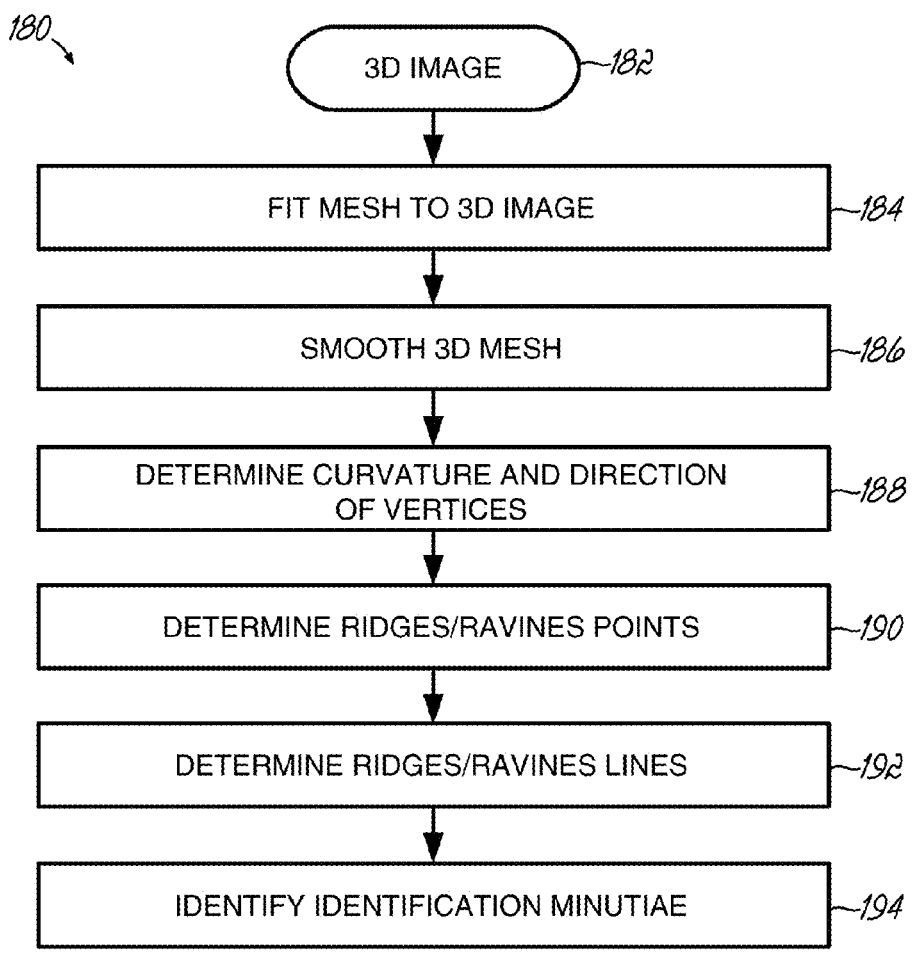
FIG. 10 is a flowchart illustrating a sequence of operations executable by a processor of the computer of FIG. 1 to thereby cause the processor to perform steps necessary to identify identification minutiae on the three dimensional image of FIG. 4.

Turning now to FIG. 10, this figure provides flowchart 160 that illustrates a sequence of operations that may be performed by the computer executing an application to identify identification minutiae on an identification feature represented by a three dimensional image. The three dimensional image of the identification feature may be captured using a three dimensional scanner, including for example a three dimensional fingerprint scanner or other such device, and the three dimensional image may be received by the computer (block 182). In some embodiments, the computer may analyze one or more voxels of the three dimensional image to identify identification minutiae. In some embodiments, the computer may fit a mesh including a plurality of vertices to the surface represented by the three dimensional image (block 184). In some embodiments of the invention, the vertices of the mesh are in a triangular relationship to one another.

Figure 11:
FIG. 11 is an example of the three dimensional image of FIG. 4 after the computer performs one or more filtering operations.
Figure 12:
FIG. 12 an example of the three dimensional image of FIG. 4 after the computer performs one or more filtering operations.

The computer may smooth the three dimensional mesh to reduce noise and gaps that may be present in the three dimensional image due to capture (i.e., scanning) of the identification feature (block 186). In some embodiments the computer may smooth the mesh using a centroid smoothing process. In such centroid smoothing, a smoothed mesh is generated by using adjacent triangles. For every vertex in the mesh, a one-ring neighborhood is considered. Then the arithmetic mean of the centroids of the adjacent triangles of the considered vertex is obtained as a new vertex. Additional details regarding such centroid smoothing are provided in "Fast and robust detection of crest lines on meshes," by Yoshizawa et al., Symposium on Solid and Physical Modeling, pg. 227-232, 2005. A new mesh is formed by the new vertices, which is smoother than the old one. FIG. 11 illustrates the three dimensional image of FIG. 4 after the centroid smoothing process is performed on the three dimensional image. In some embodiments, the computer may perform an adaptive smoothing process by smoothing the normals of the mesh using a Guassian filter and modifying the mesh vertex positions in order to fit the mesh to the field of the smoothed normals. Additional details regarding such adaptive smoothing are provided in "Mesh smoothing by adaptive and anisotropic Gaussian filter applied to mesh normals," by Ohtake et al., Vision, Modeling, and Visualization, pg. 203-210, 2002. FIG. 12 illustrates the three dimensional image of FIG. 11 after performing the adaptive smoothing process.

The computer analyzes the smoothed mesh to determine the curvature and direction of the vertices of the mesh (block 188). In some embodiments, the computer determines a normal vector for each vertex of the mesh. Determining the normal vector for each vertex may include determining an average of face normals for faces adjacent to the vertex, where the computer may also apply different weightings to the face normals. The normal vector for each vertex may also be determined as the normal to a plane that best fits the vertex and one or more nearby vertices. The normal for each vertex may be determined as a normalized weighted sum of normals of triangles incident to the vertex as described in "Weights for computing vertex normals from facet normals," by Nelson, Journal of Graphics Tools, vol. 4, pg. 1-6, March 1999. The computer may build a local coordinate system with an origin located at each vertex based at least in part on the determined normal vector and two orthonormal vectors in a plane through the considered vertex.

The computer may fit a polynomial surface to each vertex using the local coordinate system and including neighboring points and/or vertices such that the polynomial surface may be interrogated to determine a curvature and direction for the vertex. The computer may fit the polynomial surface to the vertex by performing a quadratic fitting process. Further details regarding the quadratic fitting process are provided in "Differential geometry for characterizing 3d shape change," by Amini et al., Proceedings of SPIE Conference on Mathematical Methods in Medical Imaging, San Diego, Calif., pp. 170-181, July 1992, and further details are provided in "Range Image Segmentation Based on Differential Geometry: A Hybrid Approach," by Yokoya et al., IEEE Transactions on Pattern Analysis and Machine Intelligence, vol. 11(6), pg. 643-649, June 1989.

The computer may fit the polynomial surface to the vertex by performing a cubic fitting process. Further details regarding the cubic fitting process are provided in "A novel cubic-order algorithm for approximating principal direction vectors," by Goldfeather et al., ACM Transactions on Graphics, vol. 23(1), pg. 45-63, New York, N.Y., January 2004. A cubic polynomial may be fitted to p (the vertex under consideration) and its neighboring vertices:

$$f(x, y) = \frac{A}{2}x^2 + Bxy + \frac{C}{2}y^2 + Dx^3 + Ex^2y + Fxy^2 + Gy^3 \quad (9)$$

Each point in the selected neighborhood of p should fit in the surface such that equation (9) may be rewritten as:

$$\left(\frac{1}{2}x_i^2 \, x_i y_i \, \frac{1}{2}y_i^2 \, x_i^3 \, x_i^2 y_i \, x_i y_i^2 \, y_i^3\right) b = z_i \quad (10)$$

where $b = (A\ B\ C\ D\ E\ F\ G)^T$ and $(x_i, y_i, z_i)$ are the coordinates of the points in the selected neighborhood of p. In addition, the normals determined for the each vertex may be considered such that the calculated normal at each vertex should be equal to the normal at the point of the polynomial surface fitted to the vertex. If $(a_i\ b_i\ c_i)$ indicates the normal vector at the point $(x_i\ y_i\ z_i)$ and normal to the surface at the surface at the same point, the normal is given by:

$$N(x_i, y_i) = (f_x(x, y), f_y(x, y), -1) \quad (11)$$

$$\begin{pmatrix} Ax_i + By_i + 3Dx_i^2 + 2Ex_iy_i + Fy_i^2, Bx_i + \\ Cy_i + Ex_i^2 + 2Fx_iy_i + 3Gy_i^2 - 1 \end{pmatrix}$$

The real normal vector may be considered $$\left(-\frac{a_i}{c_i}, -\frac{b_i}{c_i}, -1\right)$$

and should be equal to equation (11), such that:

$$\left(-\frac{a_i}{c_i}, -\frac{b_i}{c_i}, -1\right) = \begin{pmatrix} Ax_i + By_i + 3Dx_i^2 + 2Ex_iy_i + Fy_i^2, Bx_i + \\ Cy_i + Ex_i^2 + 2Fx_iy_i + 3Gy_i^2 - 1 \end{pmatrix} \quad (12)$$

which leads to the following equations:

$$(x_iy_i03x_i^22x_iy_iy_i^20)b = -\frac{a_i}{c_i} \quad (13)$$

$$(0x_iy_i0x_i^22x_iy_i3y_i^2)b = -\frac{b_i}{c_i} \quad (14)$$

A linear least-square method may be performed to solve the equations (10), (13), and (14) as system Ub=d.

The computer may extract the curvature and directions from the local surface fitted to each vertex to determine the curvature and direction of the vertices. If P is a point on the polynomial surface S fitted to the vertex, X(u, v) may be considered a local parameterization of S in a neighborhood of P. The partial derivatives of X with respect to u and v may be denoted by $x_u(P)$ and $x_v(P)$. The unit normal vector N(P) to the surface at point P may be computed as:

$$N(P) = \frac{X_u(P) \times X_v(P)}{|X_u(P) \times X_v(P)|} \quad (15)$$

Moreover, $X_u(P)$, $X_v(P)$, N(P) may be considered the local orthogonal coordinate system, and the coefficients of the first fundamental form may be computed as:

$$E = X_u(P) \cdot X_u(P) \quad (16)$$

$$F = X_u(P) \cdot X_v(P) \quad (17)$$

$$G = X_v(P) \cdot X_v(P) \quad (18)$$

The coefficients of the second fundamental form may be computed as:

$$e = N(P) \cdot X_{uu}(P) \quad (19)$$

$$f = N(P) \cdot X_{uv}(P) \quad (20)$$

$$g = N(P) \cdot X_{vv}(P) \quad (21)$$

The Weingarten curvature matrix at the point P may therefore be computed as:

$$W = \begin{bmatrix} \dfrac{eG - fF}{EG - F^2} & \dfrac{fE - eF}{EG - F^2} \\ \dfrac{fG - gF}{EG - F^2} & \dfrac{gE - fF}{EG - F^2} \end{bmatrix} \quad (22)$$

Furthermore, when $x_u$ and $x_v$ are orthogonal unit vectors, the matrix becomes the symmetric matrix:

$$W = \begin{pmatrix} e & f \\ f & g \end{pmatrix} \quad (23)$$

Furthermore, assuming v is a unit vector in the tangent plane to S at P, then $K_v = v^T W v$ is the normal curvature of the surface at point P in the direction of v.

The eigenvalues $\gamma_1$ and $\gamma_2$ of the matrix W are the maximum and minimum principal curvatures of the surface at point P. The eigenvectors $v_1$ and $v_2$ are the corresponding maximum and minimum principal directions. Since $x_u$ and $x_v$ are orthogonal unit vectors, equation (23) may be rewritten as:

$$W = \begin{pmatrix} A & B \\ B & C \end{pmatrix} \quad (24)$$

Figure 13:
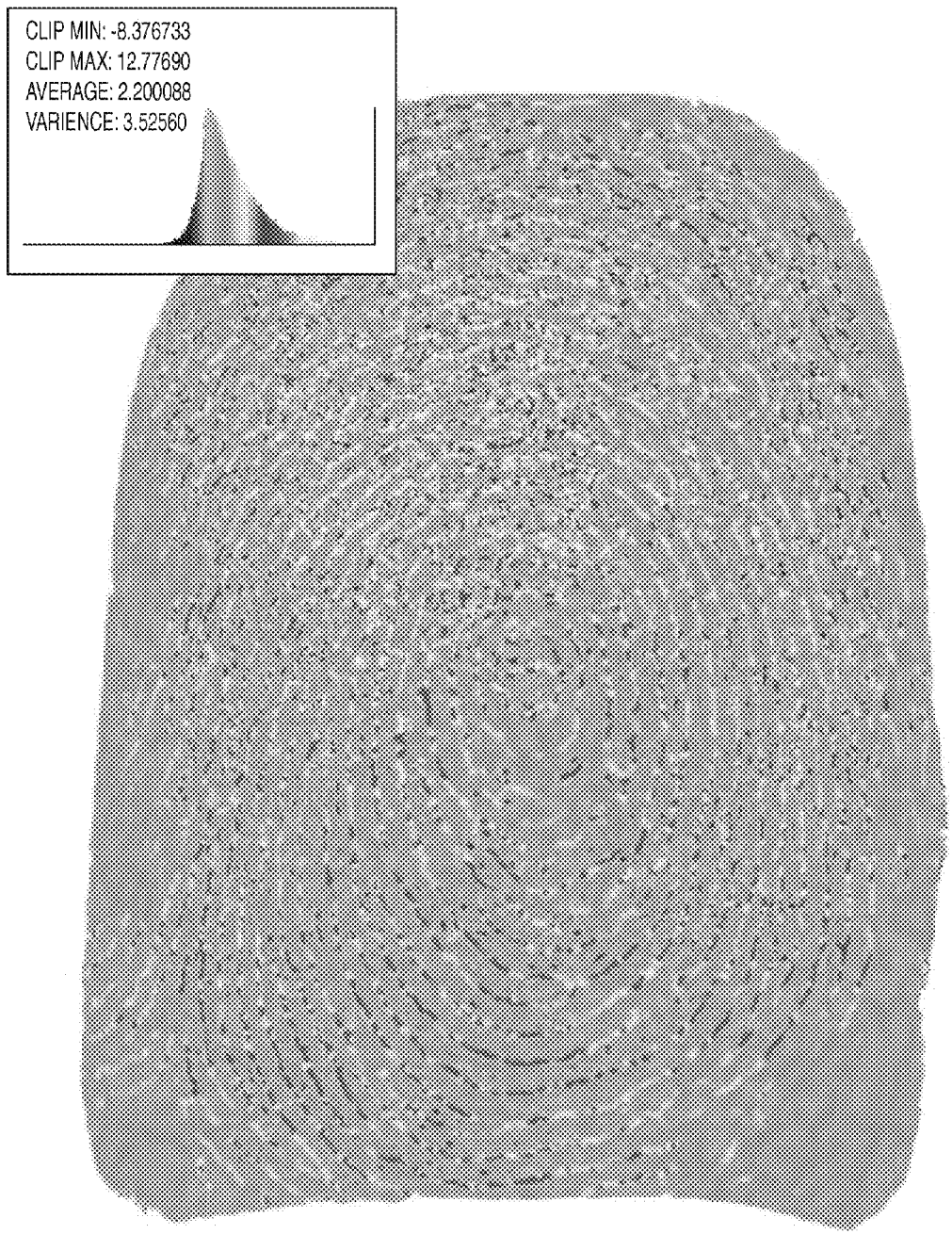
FIG. 13 illustrates the maximum principal curvature for vertices of a mesh on the three dimensional image of FIG. 12.
Figure 14:
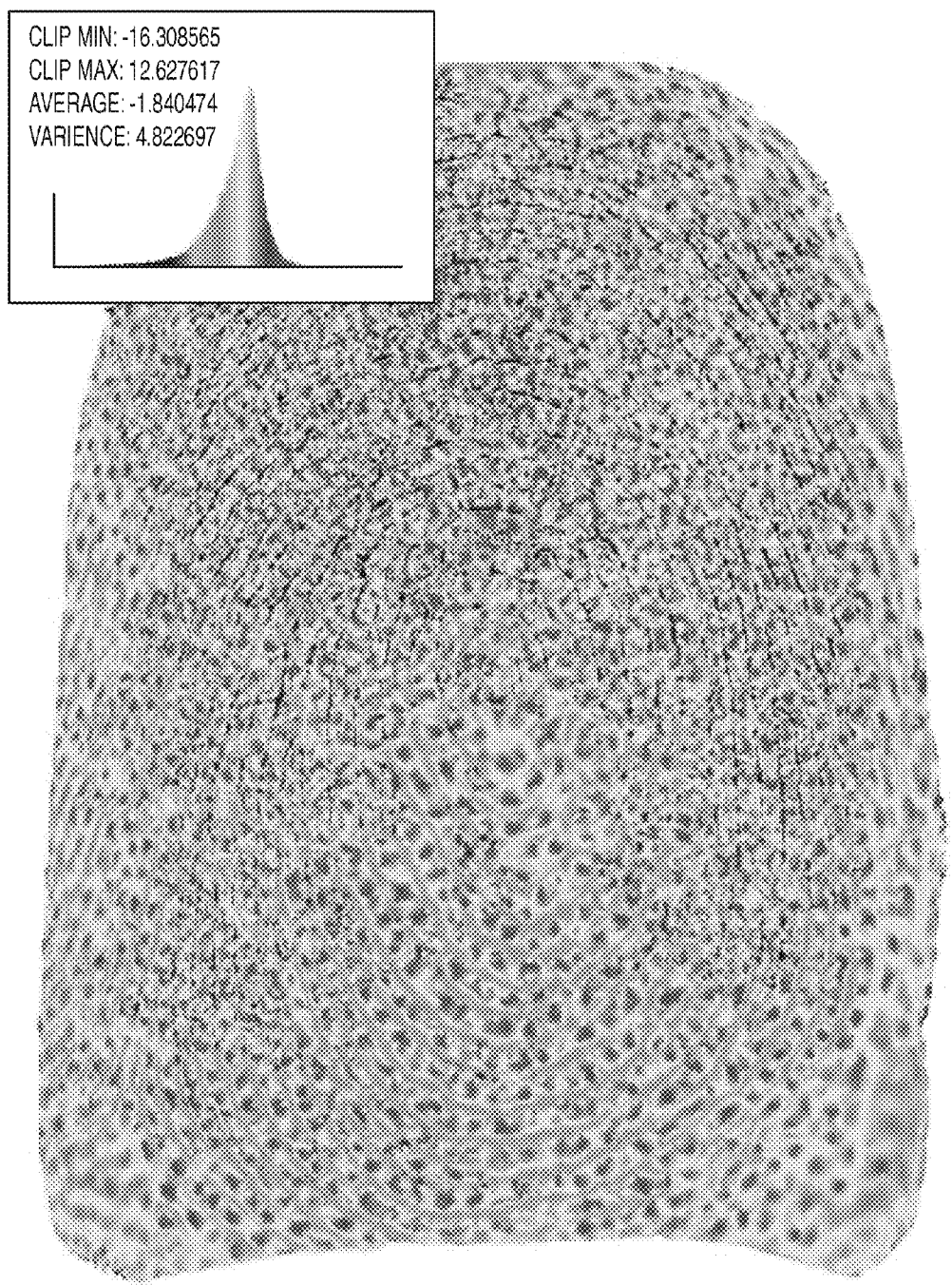
FIG. 14 illustrates the minimum principal curvature for vertices of the mesh on the three dimensional image of FIG. 12.
Figure 15:
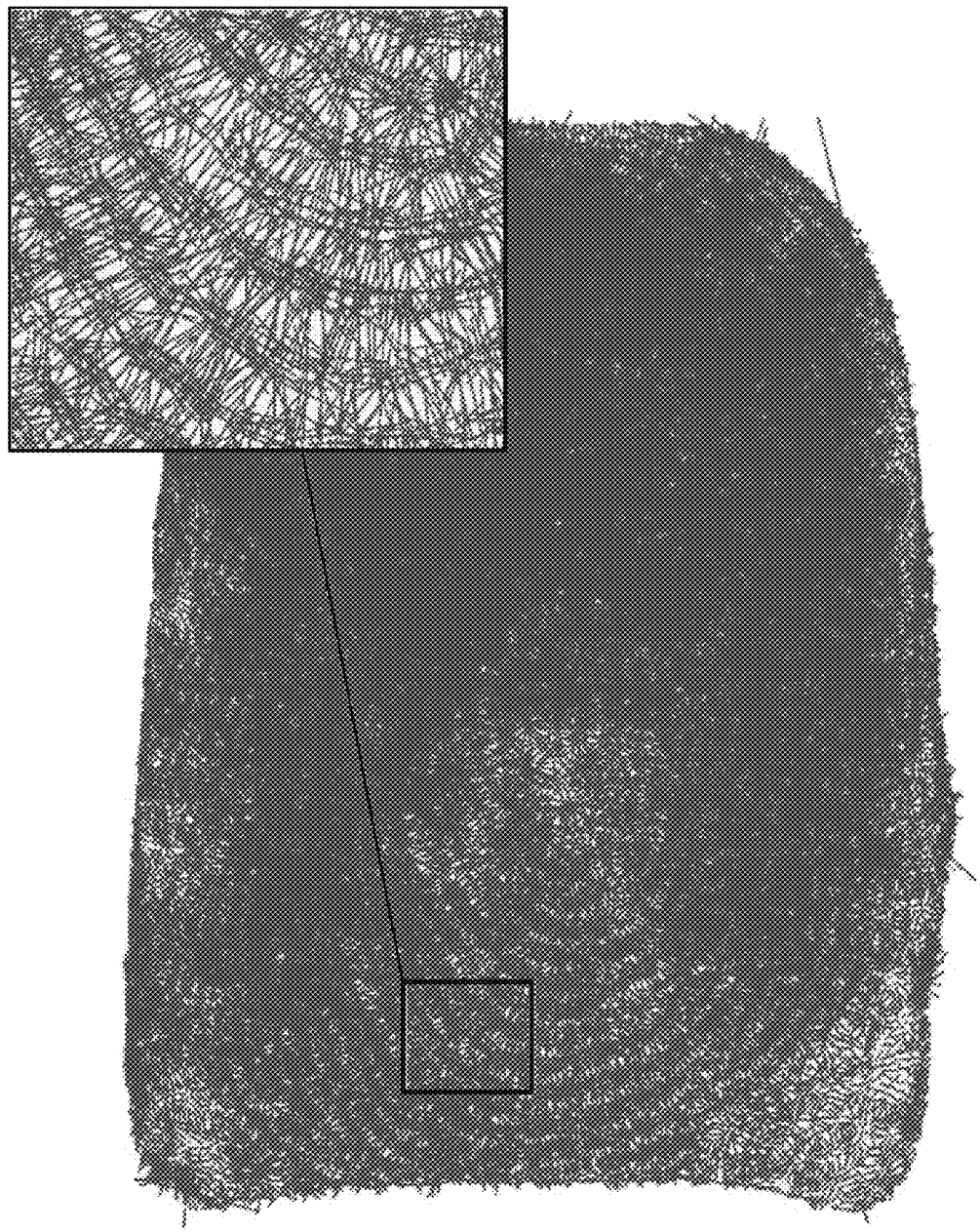
FIG. 15 illustrates the maximum principal direction for vertices of the mesh of the three dimensional image of FIG. 12.
Figure 16:
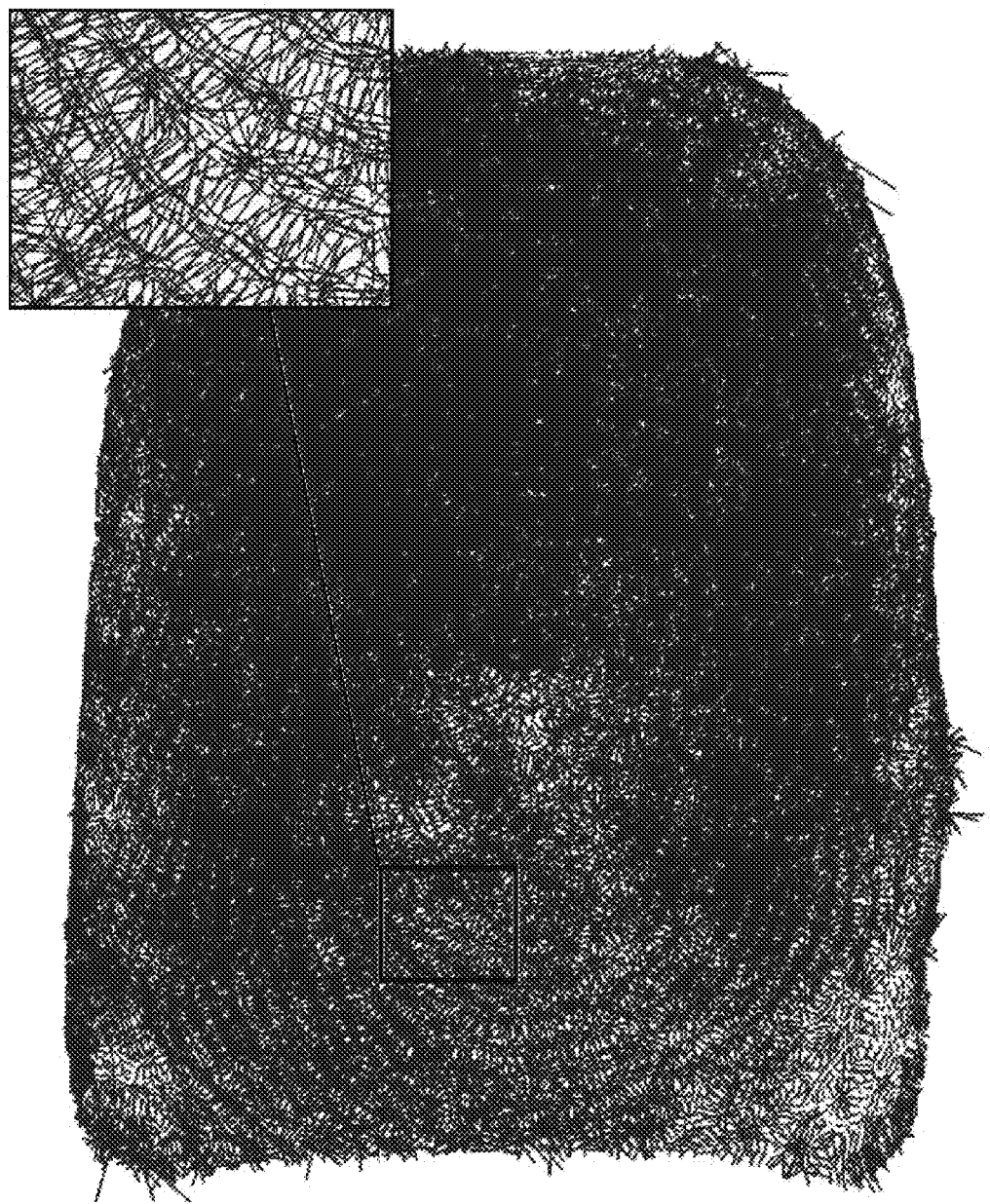
FIG. 16 illustrates the minimum principal direction for vertices of the mesh of the three dimensional image of FIG. 12.

As such, using matrix W, the eigenvalues and eigenvectors of W may be computed to thereby determine the principal curvature and principal direction of each vertex of the mesh. FIG. 13 illustrates the maximum principal curvature for vertices of a mesh on the three dimensional image of FIG. 12. FIG. 14 illustrates the minimum principal curvature for vertices of the mesh on the three dimensional image of FIG. 12. FIG. 15 illustrates the maximum principal direction for vertices of the mesh of the three dimensional image of FIG. 12, and FIG. 16 illustrates the minimum principal direction for vertices of the mesh of the three dimensional image of FIG. 12.

Returning to flowchart 180 of FIG. 10, the computer analyzes the curvatures and directions associated with each vertex to determine ridge and ravine points of the identification feature represented by the three dimensional image (block 190). In some embodiments, the computer analyzes the points (i.e., vertices) to determine whether each point corresponds to a ridge or ravine point. A point may correspond to a ridge point if the maximal principal curvature attains a local positive maxima along its curvature line. Similarly, a point may correspond to a ravine point if the minimal principal curvature attains a negative minimum along its curvature line. In general, ridges and ravines are dual in nature, and the computer may consider either or both in identifying identification minutiae. Further details regarding determining which vertices correspond to a ridge point or a ravine point are provided in "Detection of ridges and ravines on range images and triangular meshes," by Belyaev et al., Vision Geometry IX, SPIE 4117, pg. 146-154, San Diego, Calif., July-August 2000, and further details may be found in *Three Dimensional Computer Vision*, ch. 4: Edge Detection, MIT Press, 1993.

In analyzing the vertices to determine whether each corresponds to a ridge (i.e., a ridge vertex) or ravine point (i.e., a ravine vertex), the maximal and minimal curvatures of the vertex are called $k_{max}$ and $k_{min}$ and the maximal and minimal directions are called $t_{max}$ and $t_{min}$. The computer determines the intersection between the normal plane of the vertex set as P and a polygon formed by a first ring of neighboring vertices, where the normal plane may be generated by the normal vector at P and the maximal principal curvature at P. The surfaces intersect at two points: Q and S by linear interpolation of curvature values of neighboring vertices. If the maximum principal curvature at P is greater than the interpolated curvature values of Q and S, then the maximum principal curvature attains a maximum at P along the normal section curve and P corresponds to a ridge point. A similar comparison may be performed to determine whether the vertices correspond to ridge points, where the minimum principal curvature would be less at P than the interpolated curvature values at the comparison points. Each vertex that corresponds to a ridge point or a ravine point is marked accordingly. Furthermore, all marked vertices may be checked using the following relationship:

$$\text{Ridge: } k_{max} > |k_{min}| \qquad (25)$$

$$\text{Ravine: } k_{min} < -|k_{max}| \qquad (26)$$

Figure 17:
FIG. 17 illustrates determined ridge and ravine vertices of a mesh fitted to the three dimensional image of FIG. 12.

FIG. 17 provides an illustration of identified ridge points 202 (shown in red) and ravine points 204 (shown in blue) for the identification feature represented in the three dimensional image of FIG. 4. In order to reduce fragmentation of ridges, the ridge vertices may be further filtered by requiring each ridge vertex to neighbor at least two other ridge vertices. The ravine vertices may be filtered in a similar manner.

Figure 18:
FIG. 18 illustrates determined ridge and ravine lines for the three dimensional image of FIG. 4.

The computer may determine ridge and ravine lines based on the determined ridge and ravine points (block 192). In some embodiments, the computer traces the ridge vertices together to generate ridge lines and the ravine vertices together to generate ravine lines for the three dimensional image. FIG. 18 illustrates the determined ridge lines 206 (shown in red) and the ravine lines 208 (shown in blue) based on the marked vertices of FIG. 17. Further details regarding tracing generating the ridge and ravine lines are provided in "Ridge-valley lines on meshes via implicit surface fitting," by Ohtake et al., *ACM Transactions on Graphics*, vol. 23(3), pg. 609-612, New York, 2004.

In some embodiments, the computer may analyze curvature principals and derivatives thereof for each vertex to determine whether the vertex corresponds to a ridge point (i.e., a ridge vertex) or a ravine point (i.e., a ravine vertex). If S is the surface oriented to the vertex, and P is a point of the surface, the maximal and minimal curvatures of S at P are called $k_{max}$ and $k_{min}$ and the corresponding principal directions are $t_{max}$ and $t_{min}$ which are the associated tangent directions of S at P, and $e_{max}$ and $e_{min}$ denote the derivatives of the principal curvatures along the corresponding curvature directions:

$$e_{max} = \partial k_{max}/\partial t_{max} \text{ and } e_{min} = \partial k_{min}/\partial t_{min} \qquad (27)$$

The point at which the principal curvatures are equal to each other ($k_{max} = k_{min}$) is called umbilic; $e_{max}$ and $e_{min}$ are not defined at umbilic points, because the principal directions are undefined there. A non-umbilic point P is called a ridge point if $k_{max}$ attains a local maximum at P along the corresponding principal direction $t_{max}$. A non-umbilic point P is called a ridge point if $k_{min}$ attains a local minimum at P along the corresponding principal direction $t_{min}$. As such, ridge and ravine vertices may be characterized as:

$$\text{Ridges: } e_{max}=0, \partial e_{max}/\partial t_{max}<0, k_{max}>|k_{min}| \qquad (28)$$

$$\text{Ravines: } e_{min}=0, \partial e_{min}/\partial t_{min}>0, k_{min}<-|k_{max}| \qquad (29)$$

It should be noted that if the orientation of the surface changed, ridges may be described as ravines and vice-versa.

The computer may determine an extremality coefficient $e = \partial k/\partial t$ for the surface given based on the following relationship:

$$e = \partial k/\partial t = \begin{pmatrix} t_1^2 \\ t_2^2 \end{pmatrix}^T \begin{pmatrix} 6D & 2E \\ 2F & 6G \end{pmatrix} \begin{pmatrix} t_1 \\ t_2 \end{pmatrix} \qquad (30)$$

where $t=(t_1, t_2)^T$ is the principal direction corresponding to the principal curvature k. Further details are provided in *Computational Differential Geometry Tools for Surface Interrogation, Fairing, and Design* by Yoshizawa, PhD thesis, Saarland University, 2006, MPI Informatik.

The computer may detect ridge points according to the process described in the previously referenced article "Ridge-valley lines on meshes via implicit surface fitting." To detect ridge points, edges of the mesh are analyzed, where an edge e is defined by two neighboring vertices $v_1$ and $v_2$. To determine ridge points for each edge in the mesh, the computer analyzes points along the the edge e based on the following conditions:

$$k_{max}(v) > |k_{min}(v)| \text{ for } v = v_1, v_2 \qquad (31)$$

$$e_{max}(v_1)e_{min}(v_2) < 0 \qquad (32)$$

$$e_{max}(v_1)[(v_{3-i}-v_1) \cdot t_{max}(v_i)] > 0 \text{ with } i=1 \text{ or } 2 \qquad (33)$$

Equation (32) corresponds to whether $e_{max}$ has a zero crossing on the edge e, and equation (33) corresponds to whether $e_{max}$ obtains a maximum on edge e. Based at least in part on these conditions, a linear interpolation may be performed by the computer to determine a zero-crossing of $e_{max}$ on the edge, where such zero-crossing would correspond to a ridge point.

$$p = \frac{|e_{max}(v_2)|v_1 + |e_{max}(v_1)|v_2}{|e_{max}(v_1)| + |e_{max}(v_2)|} \qquad (34)$$

If two ridge points are detected on two edges of a triangle of the mesh, the ridge points may be connected by a straight line. If three ridge points are detected on three edges of a triangle of the mesh, the ridge points may be connected by the centroid of the triangle. In this manner, ridge lines may be determined. Ravine points and ravine lines may be detected in the same manner.

Returning to flowchart 180 of FIG. 10, after determining the ridge and/or ravine lines on the three dimensional image, the computer may analyze the ridge and/or ravine lines to identify identification minutiae on the three dimensional image (block 194). In some embodiments, the computer may perform one or more processing procedures on the three dimensional image to remove short ridges, remove short branches, and/or connect broken ridges/ravines. In general, short ridges, short branches and/or broken ridges/ravines may be caused on the three dimensional image by noise or other artifacts during scanning of the identification feature. Short ridges may be removed by the computer by determining a ridge length for each ridge and removing ridges below a defined threshold. Short branches may be similarly removed. Connecting broken ridges/ravines may be performed by the computer by determining a shortest distance between two ridge/ravine ends, and if the distance therebetween is below a threshold and the ridge/ravine directions are similar, then the ends may be connected by the computer.

Figure 19:
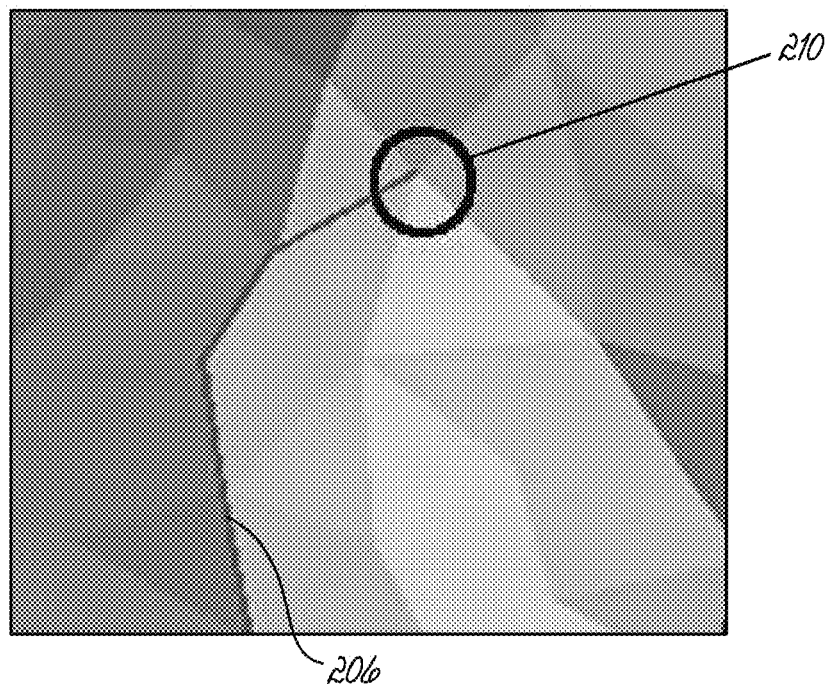
FIG. 19 illustrates an example of a ridge termination type of identification minutiae.

FIG. 19 provides an example illustration of a type of ridge identification minutiae, referred to as a ridge termination 210.

Figure 20:
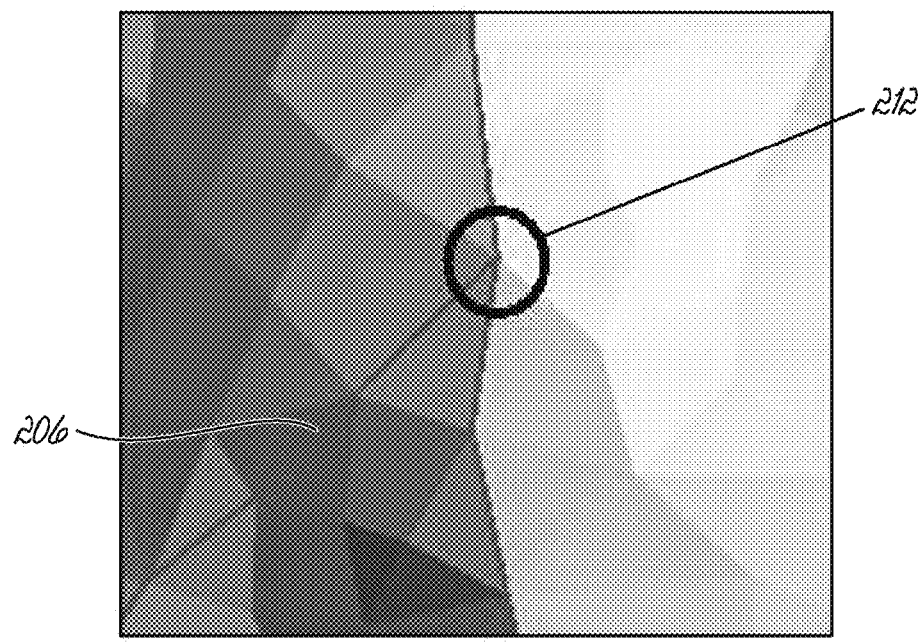
FIG. 20 illustrates an example of a ridge bifurcation type of identification minutiae.
Figure 21:
FIG. 21 illustrates an example of identified identification minutiae for the three dimensional image of FIG. 4.

FIG. 20 provides an example illustration of another type of ridge identification minutiae referred to as a ridge bifurcation 212. Ravines generally include the same types of identification minutiae. In some embodiments of the invention, identifying identification minutiae includes analyzing each vertex of the mesh to determine a degree associated with each vertex. The degree of a vertex may correspond to the number of ridge edges incident the vertex. For example, a vertex with a degree of two indicates that the vertex is in the middle of a ridge. A vertex with a degree of one corresponds to a ridge termination identification minutiae (see e.g., 210 of FIG. 19), and a vertex with a degree of three corresponds to a ridge bifurcation identification minutiae (see e.g., 212 of FIG. 20). All vertices having a degree of one or three associated therewith are marked as identification minutiae. A similar relationship may be utilized if ravine identification minutiae were to be utilized for identification purposes. FIG. 21 provides an example of marked identification minutiae 214, 216 (illustrated as red indicators 214 and blue indicators 216) on the three dimensional image of FIG. 4 based on the determined ridge lines 206 illustrated in FIG. 18.

Figure 22:
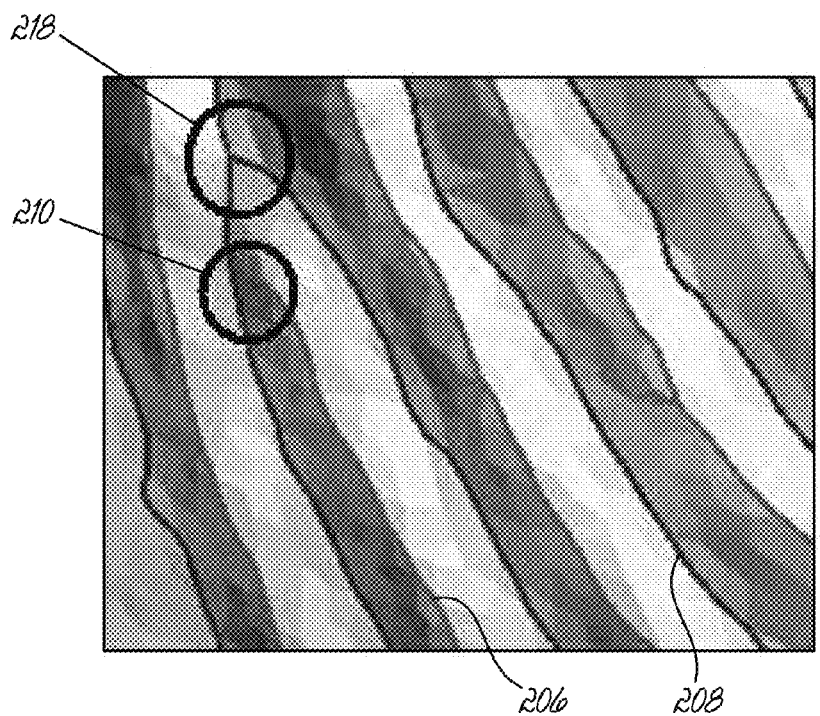
FIG. 22 illustrates an example of a ridge termination type identification minutiae and an example of a ravine bifurcation type identification minutiae.
Figure 23:
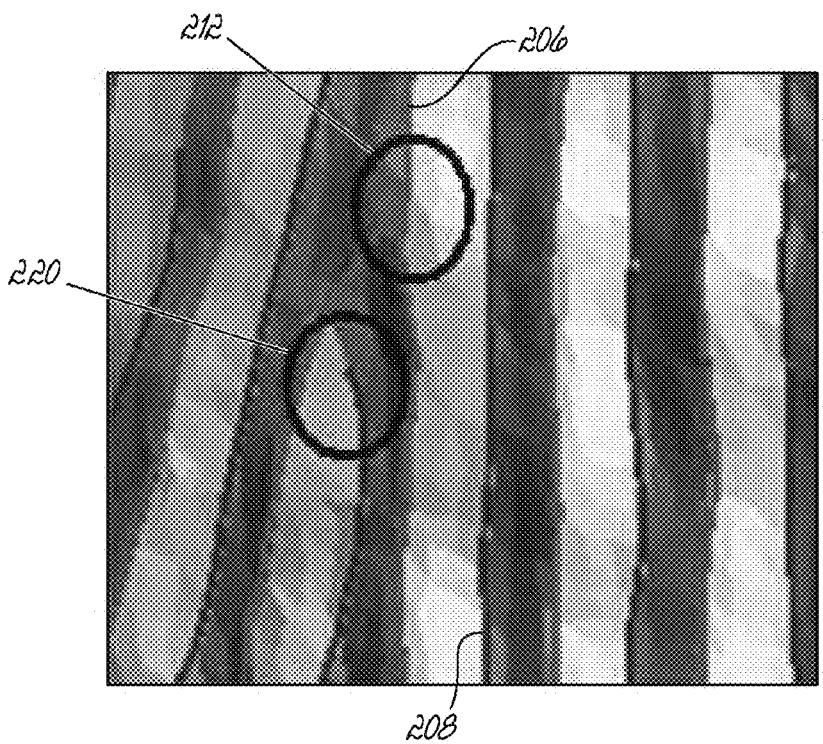
FIG. 23 illustrates an example of a ridge bifurcation type identification minutiae and an example of a ravine termination type identification minutiae.

Moreover, in some embodiments, identifying the identification minutiae on the three dimensional image may include selectively filtering the identified identification minutiae based on a quality associated with each identification minutiae. In general, ridge identification minutiae and ravine identification minutiae are dual in nature; i.e., a ridge termination is generally proximate a ravine bifurcation, and similarly, a ridge bifurcation is generally proximate a ravine termination. FIGS. 22 and 23 provide examples illustrating this relationship—FIG. 22 illustrates a ridge termination 210 proximate a ravine bifurcation 218, and FIG. 23 illustrates a ridge bifurcation 212 proximate a ravine termination 220. In some embodiments, the computer selectively filters the identified identification minutiae based on this relationship—where the computer marks identified ridge identification minutiae that are proximate the corresponding ravine identification minutiae as high quality identification minutiae, and the computer may ignore identified ridge identification minutiae that are not proximate the corresponding ravine identification minutiae, as such ignored ridge identification minutiae are of low quality. In FIG. 21, the identified ridge identification minutiae that are not proximate the corresponding ravine identification minutiae are illustrated with blue indicators 216 and the high quality identification minutiae are illustrated with red indicators 214.

As described previously, after identifying the identification minutiae, the computer may generate an identification minutiae dataset based on the identified identification minutiae and compare and/or determine an identity based on the identified identification minutiae of the identification minutiae dataset by comparing the identification minutiae dataset to other identification minutiae datasets that include a corresponding identity associated therewith.

For example, if an identity is to be confirmed, the identified identification minutiae extracted from the three dimensional image may be compared to a dataset including previously confirmed identification minutiae associated with the identity. If an identity is to be determined, the computer may compare the identification minutiae dataset to a database of identification minutiae datasets that have been previously associated with an identity to determine if the identification minutiae dataset of the three dimensional image matches any datasets of the database.

In some embodiments, the computer may further selectively filter identified identification minutiae based on a quality associated with different regions of the three dimensional image. In such embodiments, the computer may determine a quality associated with each region of the three dimensional image based at least in part on depth and/or flow information associated with the regions. In such embodiments, regions that include low-depth and/or low flow direction may represent unstable areas where identification minutiae detection may be unreliable.

Figure 24:
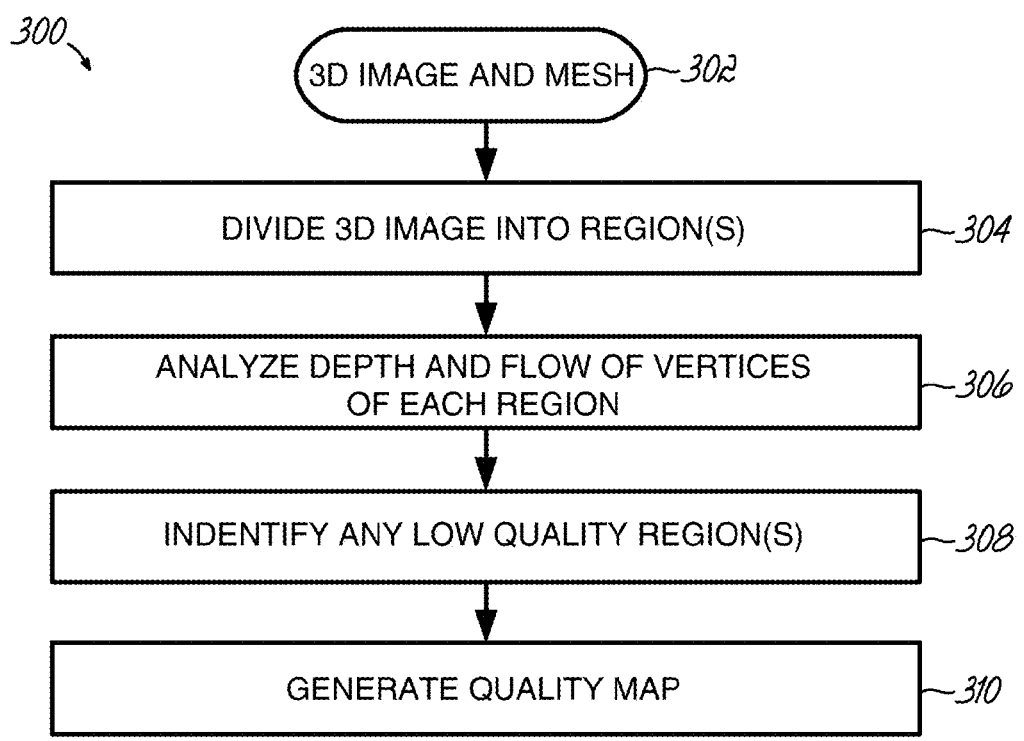
FIG. 24 is a flowchart illustrating a sequence of operations executable by a processor of the computer of FIG. 1 to thereby cause the processor to perform steps necessary to generate a quality map for the three dimensional image of FIG. 4.
Figure 25:
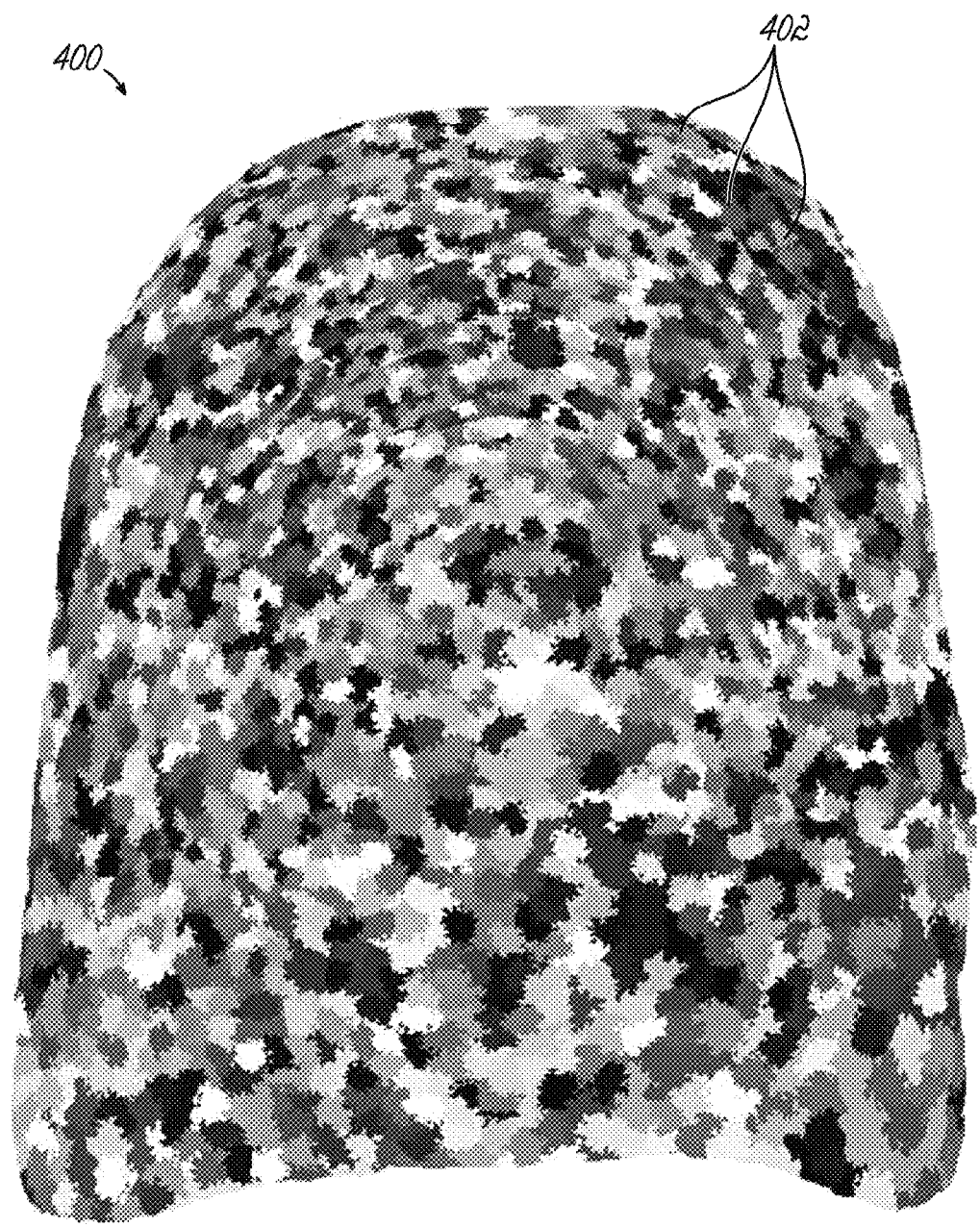
FIG. 25 is an example of a region map for the three dimensional image of FIG. 4.

FIG. 24 provides flowchart 300 that illustrates a sequence of operations that may be performed by the computer to identify any low quality regions on the three dimensional image. The computer may receive the three dimensional image including the mesh (block 302). The computer may divide the three dimensional image into regions of a predefined number of mesh vertices. The number of mesh vertices may be determined based at least in part on a required reliability and/or a required efficiency. For example, FIG. 25 illustrates a region map 400 that includes regions 402 composed of approximately thirty vertices. Regions composed of different number of vertices may be utilized to adjust for efficiency and/or reliability.

The computer may analyze each region to determine a depth and flow associated therewith (block 306). Depth information for a particular region may be determined based at least in part on one or more curvature tensors associated with vertices of the region, determined ridges and ravines in the region, and/or a depth associated with each vertex of the region. The computer may check the curvature tensor for each ridge and ravine vertex using the following conditions:

$$\text{ridge vertex: } k_{max} > T \tag{35}$$

$$\text{ravine vertex: } k_{min} < -T \tag{36}$$

Figure 26:
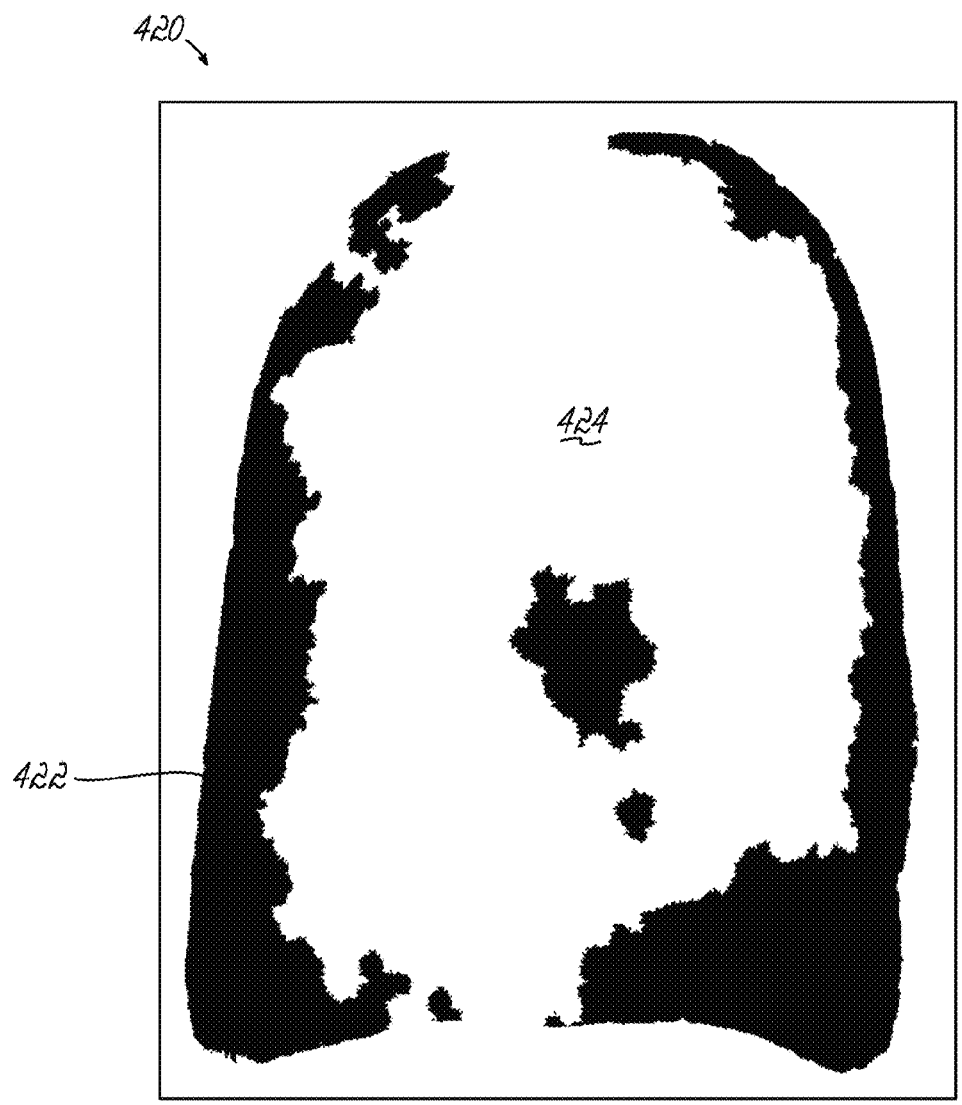
FIG. 26 is an example of a low depth map for the three dimensional image of FIG. 4.

T is a threshold associated with the physical normal ridge depth of an identification feature. If such conditions are met, the vertex is marked as an acceptable vertex, otherwise the vertex is marked as unacceptable. The result for the region may be determined by taking the average of the values for each vertex of the block such that the average curvature for the region must meet the threshold T, and if the average does not meet the threshold condition, the region may be identified as a low-quality region. Each region may be identified as a low quality region based on the number of acceptable/unacceptable vertices located in the region. FIG. 26 illustrates an example low depth information map 420 based on the regions 402 of the region map 400 of FIG. 25 that may be generated based on the analysis discussed above, where the shaded regions are low-depth regions 422 and the regions illustrated in white are acceptable depth regions 424.

Flow information for the region may be determined by analyzing the principal curvature and direction for each vertex of the region. Flow generally refers to the direction and curvature of ridges. Regions where such direction and curvature are low generally correspond to regions with poorly defined ridges, where such regions generally occur due to noise and interference during scanning of the identification feature. The computer may determine the direction of ridges and ravines of the region with the following equations:

$$\text{ridge direction}[i] = \frac{\partial k_{max}[i]}{\partial t_{min}[i]} \times t_{max}[i] - \frac{\partial k_{max}[i]}{\partial t_{max}[i]} \times t_{min}[i] \tag{37}$$

$$\text{ravine direction}[i] = \frac{\partial k_{min}[i]}{\partial t_{max}[i]} \times t_{min}[i] - \frac{\partial k_{min}[i]}{\partial t_{min}[i]} \times t_{max}[i] \tag{38}$$

Figure 27:
FIG. 27 is an example of a low flow map for the three dimensional image of FIG. 4.

Aligned vertices and non-aligned vertices may be determined based on the determined direction of each vertex, and the average is taken over the vertices and the result for the block is obtained. The result is assigned to all of the vertices inside the region, where each region having a low flow assigned thereto is marked as a low-flow region. FIG. 27 provides an example of a low-flow map 440 based on the region map 400 of FIG. 25 where the regions shaded in black are low-flow regions 442 and the regions shown in white are acceptable flow regions 444.

Figure 28:
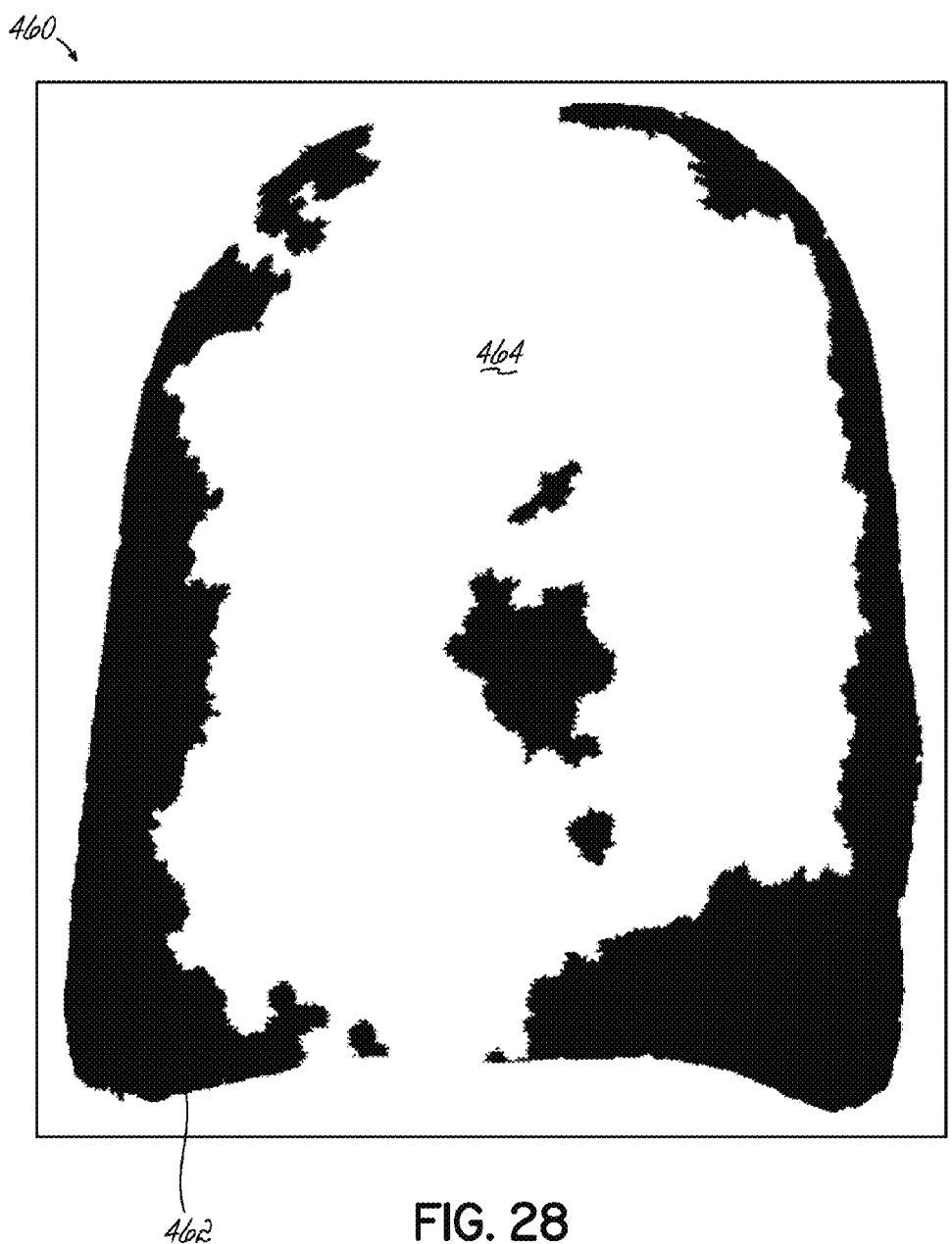
FIG. 28 is an example of a quality map for the three dimensional image of FIG. 4

Based on the determined depth and flow of each region, the computer identifies any region having a low depth and/or flow associated therewith as a low quality region (block 308), and the computer may generate a low quality map (block 310), where the low quality map may be utilized to selectively filter identified identification minutiae located in low-quality regions identified on the map. FIG. 28 provides an example low quality map 460 based at least in part on the low depth map 420 of FIG. 26 and the low flow map 440 of FIG. 27, where the shaded regions are low quality regions 462 from which identification minutiae should be discarded and the regions shown in white are high quality regions from which identified identification minutiae may be extracted.

Figure 29:
FIG. 29 is an example of the quality map of FIG. 28 applied to the identified identification minutiae shown in FIG. 21.

In some embodiments of the invention, the computer may generate the quality map based on the depth and flow characteristics of the three dimensional image, and the computer may utilize the quality map to selectively filter identified identification minutiae, such that only identification minutiae from high quality regions (i.e., reliable identification minutiae) may be utilized in confirming and/or determining an identity. FIG. 29 illustrates an example application of the quality map 460 on the identified identification minutiae shown in the example three dimensional image of FIG. 21. In this example, the reliable identification minutiae 482 are indicated in red, and the identification minutiae corresponding to low quality regions 484 are illustrated in black.

Accordingly, in some embodiments of the invention a computer may analyze a three dimensional image of an identification feature, such as a fingerprint to identify identification minutiae on the three dimensional image. The computer may selectively filter the identified identification minutiae based on proximity to corresponding identification minutiae and/or based on a quality associated with a region of the three dimensional image. The computer may extract the filtered identification minutiae to determine and/or confirm an identity associated with the identification feature of the three dimensional image. In some embodiments, the computer may directly analyze the three dimensional image to identify identification minutiae on the three dimensional image, and in other embodiments the computer may unfold the three dimensional image onto a two dimensional image such that other methods may be utilized to analyze and identify the identification minutiae.

It will therefore be appreciated that the invention may be implemented, for example, using program code implemented on one or more hardware-based computers, one or more processors, and/or one or more integrated circuits (e.g., semiconductors). Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to tangible, recordable type media such as volatile and non-volatile memory devices, floppy and other removable disks, hard disk drives, magnetic tape, optical disks (e.g., CD-ROMs, DVDs, etc.) among others.

Various additional advantages and modifications beyond those discussed herein will be apparent to one of ordinary skill in the art. Therefore, the invention lies in the claims hereinafter appended.

What is claimed is:

1. A method of analyzing a three dimensional image of a biometric identification feature, the method comprising:
   receiving the three dimensional image;
   analyzing the three dimensional image in a three dimensional space with at least one hardware based processor to identify at least one identification minutiae of the biometric identification feature in the three dimensional image based at least in part on a three dimensional characteristic determined from analyzing the three dimensional image in the three dimensional space; and
   generating an identification minutiae dataset based on the identified identification minutiae.

2. The method of claim 1, further comprising:
   comparing the identification minutiae dataset of the three dimensional image to a plurality of identification minutiae datasets each associated with an identity of a person; and
   determining an identity of a person associated with the identification feature of the three dimensional image responsive to matching the identification minutiae dataset of the three dimensional image to a identification minutiae dataset associated with the identity of the person.

3. The method of claim 1, further comprising:
   comparing the identification minutiae dataset of the three dimensional image to an identification minutiae dataset associated with an identity of a person to confirm the identity of the person based on the identification feature of the three dimensional image.

4. The method of claim 1, wherein analyzing the three dimensional image in the three dimensional space to identify at least one identification minutiae of the identification feature in the three dimensional image based at least in part on a three dimensional characteristic determined from analyzing the three dimensional image in the three dimensional space comprises:
   analyzing the three dimensional image in the three dimensional space to determine a plurality of ridges of the identification feature in the three dimensional image, wherein the at least one identification minutiae is identified based at least in part on at least one ridge of the plurality of ridges.

5. The method of claim 4, wherein analyzing the three dimensional image in the three dimensional space to identify at least one identification minutiae of the identification feature in the three dimensional image based at least in part on a three dimensional characteristic determined from analyzing the three dimensional image in the three dimensional space comprises:
   analyzing the three dimensional image in the three dimensional space to determine a plurality of ravines of the identification feature in the three dimensional image, wherein the at least one identification minutiae is identified based at least in part on at least one ravine of the plurality of ravines.

6. The method of claim 4, wherein analyzing the three dimensional image to determine a plurality of ridges of the identification feature in the three dimensional image comprises:

analyzing the three dimensional image to determine curvature for at least a portion of a surface of the identification feature, wherein the plurality of ridges are determined based at least in part on the curvature for the at least a portion of the surface of the identification feature.

7. The method of claim 6, wherein analyzing the three dimensional image to determine a plurality of ridges of the identification feature in the three dimensional image comprises:

analyzing the three dimensional image to determine direction for at least a portion of the surface of the identification feature, wherein the plurality of ridges are determined based at least in part on the direction for the at least a portion of the surface of the identification feature.

8. The method of claim 4, wherein analyzing the three dimensional image to determine a plurality of ridges of the identification feature in the three dimensional image comprises:

analyzing the three dimensional image to determine a plurality ridge points of the identification feature in the three dimensional image, wherein the plurality of ridge lines are determined based at least in part on the plurality of ridge points.

9. The method of claim 8, further comprising:

fitting a mesh including a plurality of vertices to the identification feature of the three dimensional image, wherein analyzing the three dimensional image to determine the plurality ridge points of the identification feature in the three dimensional image comprises analyzing each vertex of the mesh to determine each vertex corresponding to a ridge point.

10. The method of claim 9, wherein analyzing each vertex of the mesh to determine each vertex corresponding to a ridge point comprises:

determining a curvature associated with each vertex of the mesh, wherein each vertex of the mesh is determined to correspond to a ridge point based at least in part on the curvature associated with the vertex.

11. The method of claim 10, wherein analyzing each vertex of the mesh to determine each vertex corresponding to a ridge point comprises:

determining a direction associated with each vertex of the mesh, wherein each vertex of the mesh is determined to correspond to a ridge point based at least in part on the direction associated with the vertex.

12. The method of claim 1, wherein analyzing the three dimensional image in the three dimensional space to identify the at least one identification minutiae of the identification feature in the three dimensional image based at least in part on a three dimensional characteristic determined from analyzing the three dimensional image in the three dimensional space comprises:

fitting a mesh including a plurality of vertices to the identification feature of the three dimensional image;

determining a curvature and direction associated with each vertex of the mesh;

determining each vertex corresponding to a ridge point based at least in part on the curvature and direction associated with the vertex;

determining each vertex corresponding to a ravine point based at least in part on the curvature and direction associated with the vertex;

determining at least one ridge line of the identification feature based at least in part on the vertices of the mesh corresponding to a ridge point;

determining at least one ravine line of the identification feature based at least in part on the vertices of the mesh corresponding to a ravine point; and analyzing the at least one ridge line and the at least one ravine line to identify at least one identification minutiae of the identification feature.

13. The method of claim 12, wherein analyzing the at least one ridge line and the at least one ravine line to identify at least one identification minutiae of the identification feature comprises:

selectively filtering possible identification minutiae of the identification feature based on a proximity between a ridge line identification minutiae and a ravine line identification minutiae.

14. The method of claim 1, wherein analyzing the three dimensional image in the three dimensional space to identify at least one identification minutiae of the identification feature in the three dimensional image based at least in part on a three dimensional characteristic determined from analyzing the three dimensional image in the three dimensional space includes analyzing the three dimensional image to determine a plurality of ridge lines of the identification feature, wherein analyzing the three dimensional image to determine a plurality of ridge lines of the identification feature comprises:

unfolding the three dimensional image to generate a two dimensional image of the identification feature; and analyzing the three dimensional image to determine a texture characteristic of the three dimensional image; and applying the texture characteristic of the three dimensional image to the two dimensional image.

15. The method of claim 14, wherein analyzing the three dimensional image to determine the texture characteristic of the three dimensional image comprises:

analyzing the three dimensional image to determine a curvature associated with at least a portion of the identification feature of the three dimensional image, wherein the texture characteristic is based at least in part on the determined curvature.

16. The method of claim 1, further comprising:

analyzing the three dimensional image to identify any low quality regions of the three dimensional image, wherein analyzing the three dimensional image in the three dimensional space to identify at least one identification minutiae of the identification feature in the three dimensional image based at least in part on a three dimensional characteristic determined from analyzing the three dimensional image in the three dimensional space comprises:

selectively filtering possible identification minutiae based at least in part on the identified low quality regions of the three dimensional image.

17. The method of claim 16, further comprising:

generating a quality map based on any identified low quality regions, wherein selectively filtering possible identification minutiae based at least in part on the identified low quality regions of the three dimensional image comprises:

discarding possible identification minutiae corresponding to low quality regions according to the quality map.

18. The method of claim 16, wherein analyzing the three dimensional image to identify any low quality regions of the three dimensional image comprises:
- dividing the three dimensional image into a plurality of regions;
- analyzing a depth and flow associated with each region, wherein any low quality regions are identified based at least in part on the depth and flow associated with the region.

19. An apparatus comprising:
- at least one hardware based processor; and
- program code configured to be executed by the at least one processor to cause the at least one processor to receive a three dimensional image of an identification feature, analyze the three dimensional image in a three dimensional space to identify at least one identification minutiae of the identification feature in the three dimensional image based at least in part on a three dimensional characteristic determined from analyzing the three dimensional image in the three dimensional space, and generate an identification minutiae of the three dimensional image dataset based on the identified identification minutiae.

20. The apparatus of claim 19, further comprising:
- a database storing a plurality of identification minutiae datasets, each identification minutiae dataset of the plurality including an associated identity of a particular person,
- wherein the program code is further configured to cause the at least one processor to compare the identification minutiae datasets of the database to the identification minutiae dataset of the three dimensional image to determine an identity of a person associated with the three dimensional minutiae dataset of the three dimensional image.

21. A program product, comprising:
- program code configured to be executed by at least processor to cause the at least one processor to receive a three dimensional image of an identification feature, analyze the three dimensional image in a three dimensional space to identify at least one identification minutiae of the identification feature in the three dimensional image based at least in part on a three dimensional characteristic determined from analyzing the three dimensional image in the three dimensional space, and generate an identification minutiae of the three dimensional image dataset based on the identified identification minutiae; and
- a non-transitory recordable computer readable medium storing the program code.

22. An apparatus comprising:
- a database including a plurality of identification minutiae datasets, each identification minutiae dataset of the plurality of identification minutiae datasets being associated with an identification of a person; and
- at least one processor configured to:
  - receive an unidentified identification minutiae dataset indicating a plurality of identification minutiae extracted from a three dimensional image of an identification feature, wherein the plurality of identification minutiae are extracted from the three dimensional image of the identification feature based at least in part on a three dimensional characteristic determined from analyzing the three dimensional image of the identification feature in a three dimensional space;
  - analyze each identification minutiae dataset of the plurality to determine whether the unidentified identification minutiae dataset corresponds to a respective identification minutiae dataset based at least in part on the plurality of identification minutiae extracted from the three dimensional image; and
  - associate the unidentified identification minutiae dataset with the identification of the person associated with the corresponding respective three dimensional dataset responsive to determining that the respective identification minutiae dataset of the plurality of identification minutiae datasets corresponds to the unidentified identification minutiae dataset.

* * * * *